United States Patent [19]

Onuki

[11] Patent Number: 5,585,884
[45] Date of Patent: Dec. 17, 1996

[54] IMAGE BLUR CORRECTION APPARATUS

[75] Inventor: Ichiro Onuki, Kawasaki, Japan

[73] Assignee: Canon Kabushiki Kaisha, Tokyo, Japan

[21] Appl. No.: 352,679

[22] Filed: Nov. 30, 1994

Related U.S. Application Data

[63] Continuation of Ser. No. 962,349, Oct. 16, 1992, abandoned.

[30] Foreign Application Priority Data

Oct. 18, 1991 [JP] Japan ..................... 3-297675

[51] Int. Cl.$^6$ .............................. G03B 5/00; G03B 13/02
[52] U.S. Cl. .................... 396/51; 396/53; 396/55
[58] Field of Search ....................... 354/62, 219, 70, 354/430, 400, 412, 410, 202, 402

[56] References Cited

U.S. PATENT DOCUMENTS

| | | | |
|---|---|---|---|
| 4,109,145 | 8/1978 | Graf | 250/201 |
| 4,780,739 | 10/1988 | Kawakami et al. | 354/430 |
| 4,965,619 | 10/1990 | Shikaumi et al. | 354/410 |
| 5,020,369 | 6/1991 | Washisu et al. | 73/517 A |
| 5,036,347 | 7/1991 | Tsunekawa et al. | 354/400 |
| 5,095,198 | 3/1992 | Nakazawa et al. | 250/201.8 |
| 5,138,354 | 8/1992 | Okada et al. | 354/400 |
| 5,153,633 | 10/1992 | Otani | 354/430 |
| 5,200,774 | 4/1993 | Nakajima | 354/62 |
| 5,231,445 | 7/1993 | Onuki et al. | 354/430 X |
| 5,245,378 | 9/1993 | Washisu | 354/430 X |
| 5,245,381 | 9/1993 | Takagi et al. | 354/219 X |
| 5,262,820 | 11/1993 | Tamai et al. | 354/402 |

FOREIGN PATENT DOCUMENTS

| | | |
|---|---|---|
| 64-42639 | 2/1989 | Japan . |
| 1-241511 | 9/1989 | Japan . |
| 3-192338 | 8/1991 | Japan . |

*Primary Examiner*—W. B. Perkey
*Attorney, Agent, or Firm*—Fitzpatrick, Cella, Harper & Scinto

[57] ABSTRACT

An optical instrument having an image stabilizing function comprises an image stabilizing device comprising an image blur correction member to effect vibration suppression, a detecting device for detecting whether a part of body of a user has approached the optical instrument or not, and a control device for controlling a drive of the image stabilizing device in accordance with an output of the detecting device. Another optical instrument having an image stabilizing function comprises an image stabilizing device for effecting vibration suppression, a sight axis detection device for detecting a direction of sight axis of a user, and a control device for controlling a drive of the image stabilizing device in accordance with an output of the sight axis detection device.

21 Claims, 16 Drawing Sheets

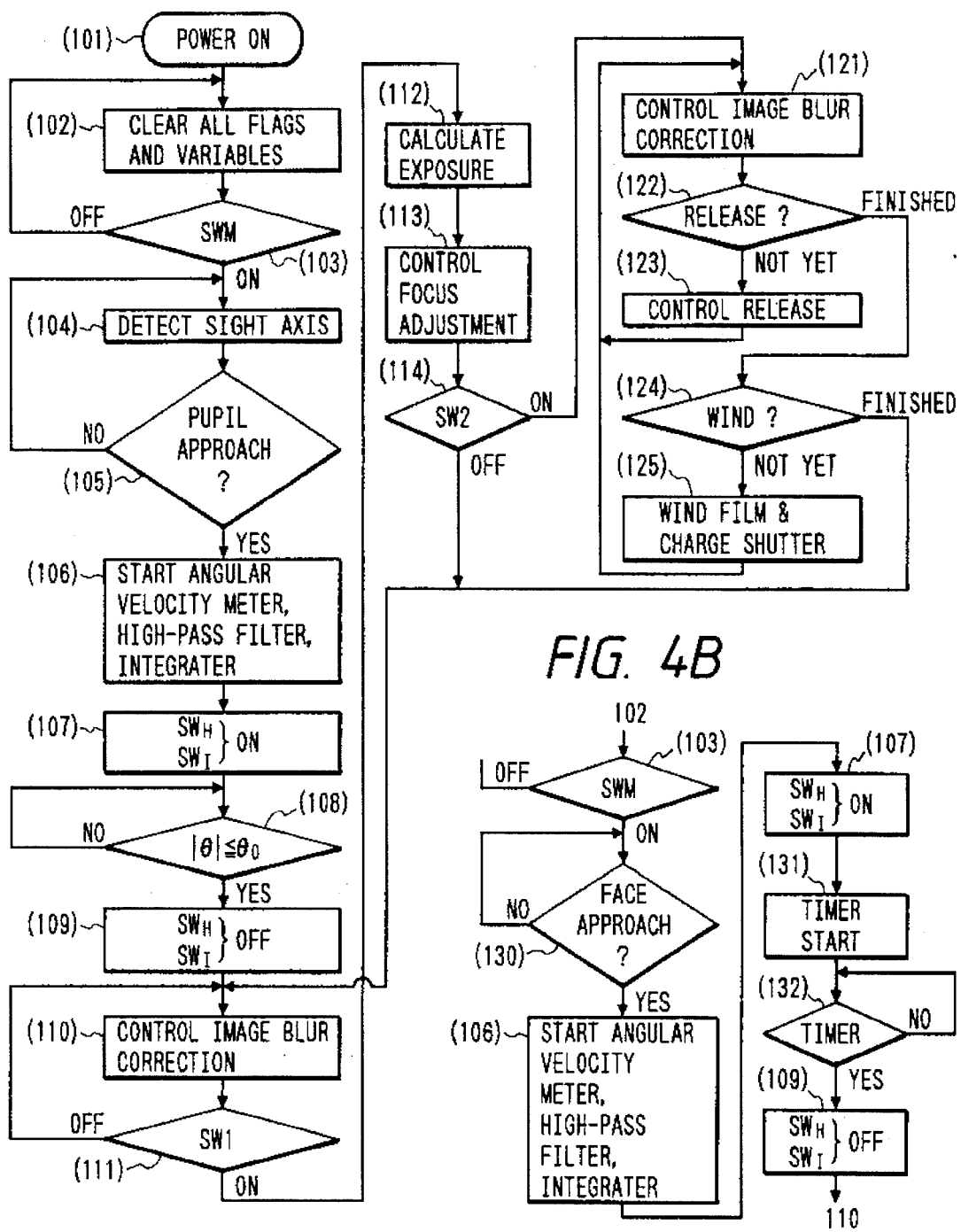

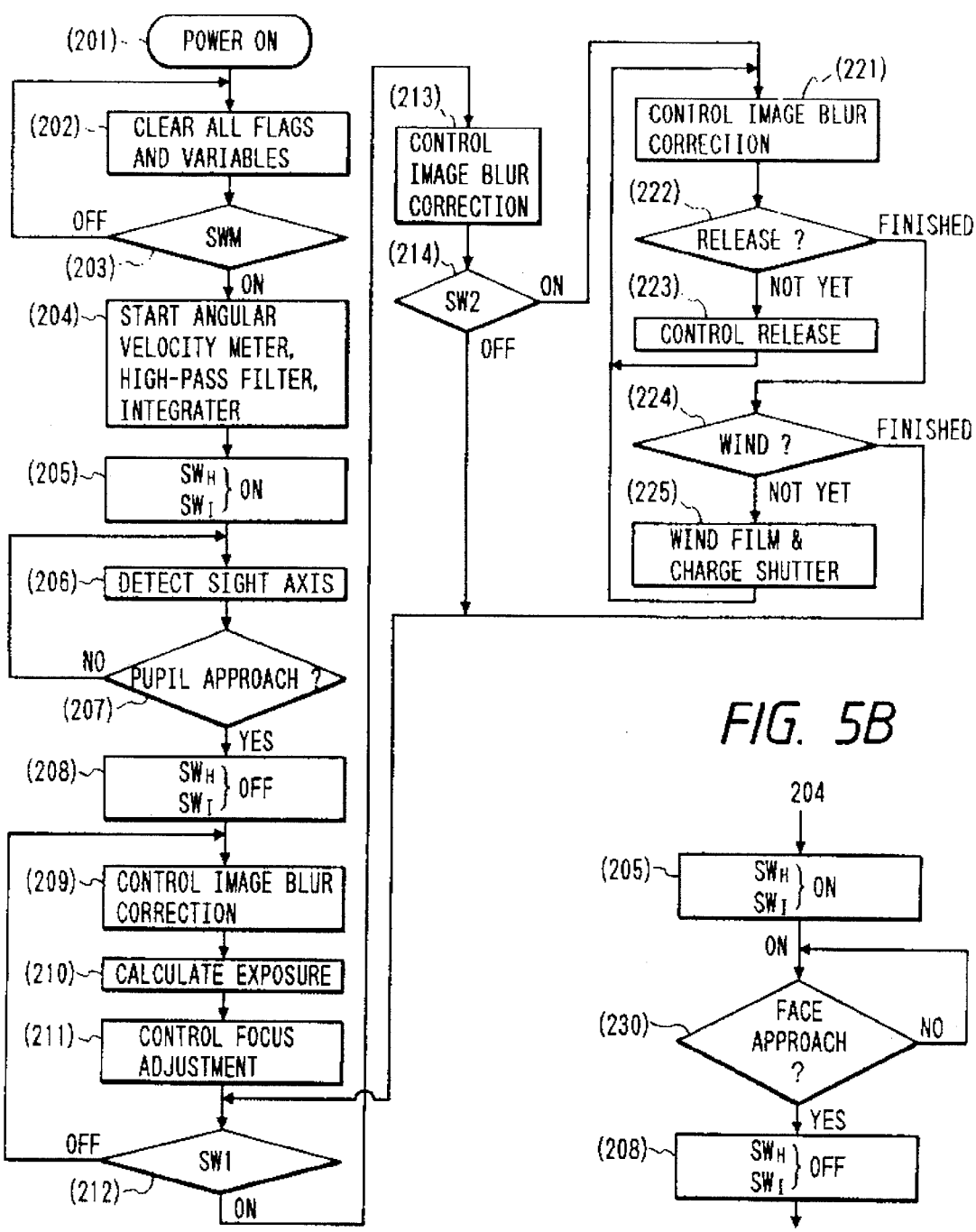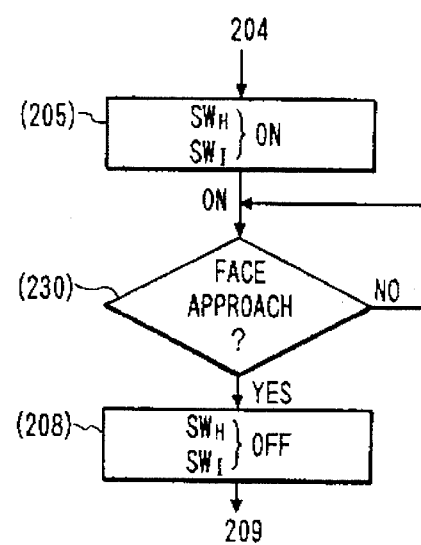

FIG. 6

| CONDITION / EMBODIMENT | SWM ON | PUPIL APPROACH | SW1 |
|---|---|---|---|
| 1st. EMB. | START SIGHT AXIS DETECTION | VIBRATION DETECTOR ON | START IMAGE BLUR CORRECTION START AE·AF |
| 2nd. EMB. | START SIGHT AXIS DETECTION | VIBRATION DETECTOR ON START IMAGE BLUR CORRECTION | START AE·AF |
| 3rd. EMB. | VIBRATION DETECTOR ON START SIGHT AXIS DETECTION | START IMAGE BLUR CORRECTION START AE·AF | LOCK AE·AF |

FIG. 8

| | | PUPIL APPROACH | |
|---|---|---|---|
| | | NO | YES |
| SW1 | OFF | × / × | × / × |
| | ON | ○ / × | ○ / ○ |

| AE·AF | |
|---|---|
| | IMAGE BLUR CORRECTION |

FIG. 10

| | | PUPIL APPROACH | |
|---|---|---|---|
| | | NO | YES |
| SW1 | OFF | × / × | ○ / × |
| | ON | ○ / × | ○ / ○ |

| AE·AF | |
|---|---|
| | IMAGE BLUR CORRECTION |

FIG. 12

|  |  | PUPIL APPROACH ||
|  |  | NO | YES |
| --- | --- | --- | --- |
| SW1 | OFF | ×  × | ○  ○ |
|  | ON | ○  × | ○  ○ |

AE·AF → IMAGE BLUR CORRECTION

FIG. 14

|  |  | PUPIL APPROACH ||
|  |  | NO | YES |
| --- | --- | --- | --- |
| SW1 | OFF | ×  × | ×  × |
|  | ON | ×  × | ○  ○ |

AE·AF → IMAGE BLUR CORRECTION

IMAGE BLUR CORRECTION APPARATUS

This application is a continuation of application Ser. No. 07/962,349 filed Oct. 16, 1992, now abandoned.

BACKGROUND OF THE INVENTION

Field of the Invention

The present invention relates to an image blur correction apparatus in which image blur is detected and image blur correction is carried out based on a detection result thereof.

Related Background Art

There are various image blur correction apparatuses conventionally proposed for correcting image blur of camera caused by hand vibration. In a representative image blur correction method among them, image blur is corrected such that vibration detecting means detects a vibration caused on a camera by hand vibration and that a blur correction optical device in a photo-taking optical system is displaced based on a deflection signal detected.

The vibration detecting means for detecting the hand vibration may be selected from an angular displacement meter, an angular velocity meter, an angular acceleration meter, and so on. It is general that such vibration detecting means has an initial-value error at an early stage of operation start and that it needs a few seconds before outputting a correct deflection signal. The vibration detecting means as listed above normally includes a high-pass filter for removing a bias component and a drift from an output signal, and/or, an integrator for converting an angular velocity or an angular acceleration of vibration into a displacement of vibration. Either of the filter and the integrator has an initial-value error, which affects the vibration detection. Then, such a technique may be employed that characteristics of the filter and/or the integrator are changed immediately after the operation start of the vibration detecting means in order to reduce the initial-value error, so as to converge the initial-value error to "0" within a short time. It is, however, the case that one second or so is needed before outputting a correct deflection signal.

In the conventional image blur correction apparatuses, the operation of the vibration detecting means is started immediately before a start of photographing, so that an image blur correction may not be effected early enough, whereby a shutter chance could be lost. There is an image blur correction apparatus which starts the operation of the vibration detecting means simultaneously with a start of power supply of camera. Such a camera will not lose a shutter chance, while having a problem of increase in dissipation power.

Meanwhile, there are applications recently filed to disclose a camera to detect a state that a photographer is ready to take a photograph and then to start a specific operation of the camera. For example, Japanese Patent Application Laid-open No. 64-42639 discloses that a light projection and reception device is located in an eye piece portion of a camera to detect an action for a photographer to view through the eye piece portion, and then to start an auto-focus control.

Also, there is an application, which is Japanese Patent Application Laid-open No. 3-192338 filed by the assignee of the present invention, disclosing that approach of a face of a photographer is judged by means for detecting a gazing or sight axis thereof and that if it is detected that a pupil of the photographer is looking into a finder of the camera the auto-focus control or the like is started.

However, the examples in the above applications concern nothing about the operation start of the image blur correction at all.

Further, U.S. Pat. No. 4,965,619 discloses such an arrangement that image stabilizing means of a photo-taking lens functions in response to a first operation of a photographer on a release button of camera.

SUMMARY OF THE INVENTION

One aspect of the present invention is an arrangement in an optical instrument having an image stabilizing device for optical blur correction in which there are disposed a detection sensor for detecting whether a user of the optical instrument approaches a finder of the optical instrument or not and a control circuit for changing an operational condition of the image stabilizing device in accordance with an output of the detection sensor, whereby enabling to avoid an unnecessary image stabilizing operation, to prevent waste power dissipation, and to execute a quick image stabilizing operation in response to a use action of the user.

Another aspect of the present invention is an arrangement in an optical instrument having an image stabilizing device for optical blur correction in which there are disposed a sight axis detection sensor for detecting a direction of a sight axis of a user and a control circuit for such a control that a change of image stabilizing property of the image stabilizing device, or, a start or a stop of the image stabilizing operation is carried out in accordance with an output of the sight axis detection sensor, whereby enabling to attain an excellent responsibility of the image stabilizing operation in an intentional operation such as panning without a negative influence on the image stabilizing property.

BRIEF DESCRIPTION OF THE DRAWINGS

FIGS. 4A and 4B are flowcharts to show an operation of a camera in the second embodiment of the present invention;

FIGS. 5A and 5B are flowcharts to show an operation of a camera in the third embodiment of the present invention;

FIG. 6 is a drawing to summarize the main operations in the first to the third embodiments of the present invention;

FIG. 8 is a drawing to summarize the operation in the fourth embodiment of the present invention;

FIG. 10 is a drawing to summarize the operation in the fifth embodiment of the present invention;

FIG. 12 is a drawing to summarize the operation in the sixth embodiment of the present invention;

FIG. 14 is a drawing to summarize the operation in the seventh embodiment of the present invention;

DETAILED DESCRIPTION OF THE PREFERRED EMBODIMENTS

Figure 1:
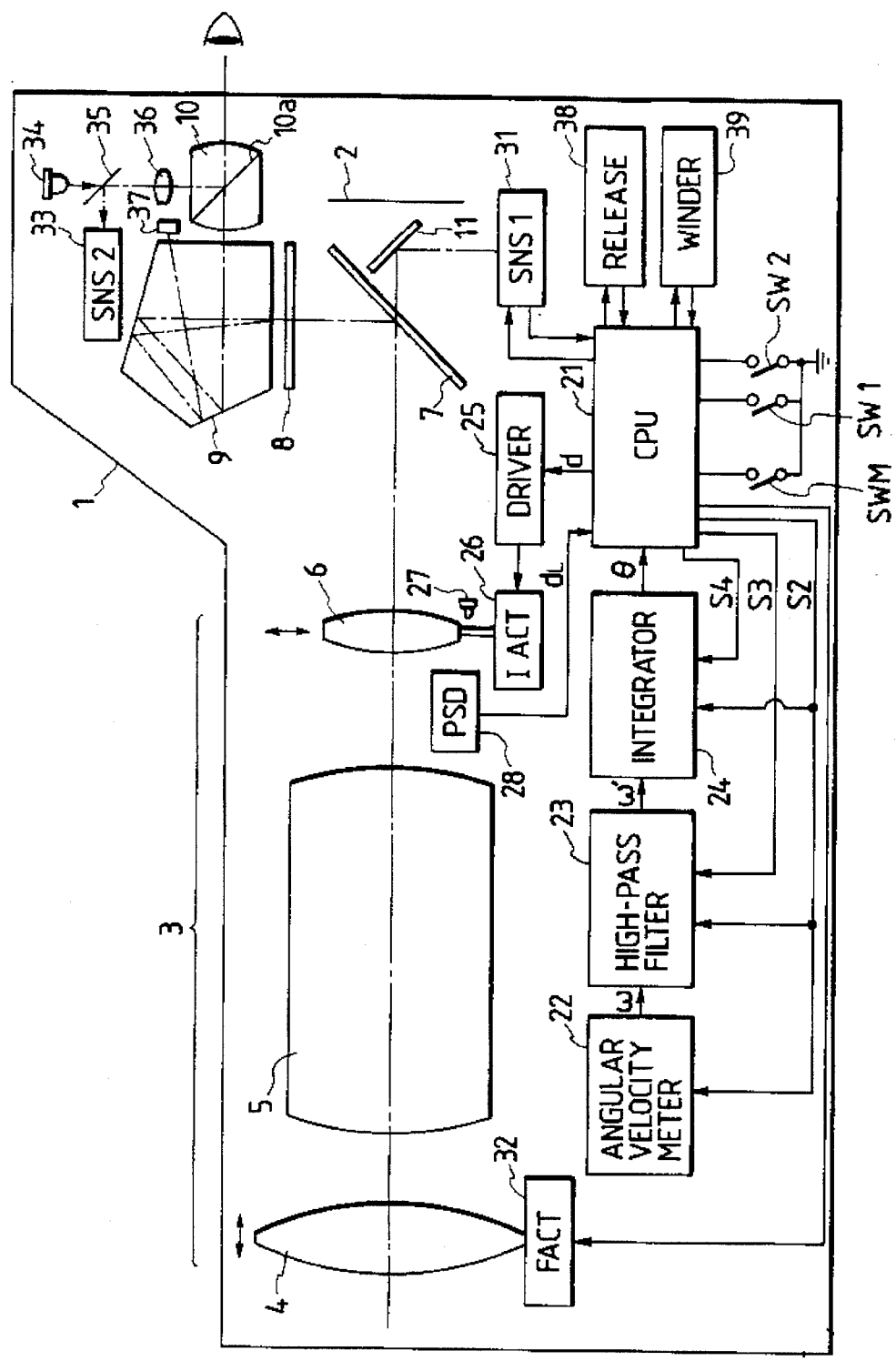
FIG. 1 is a drawing to show a structure of a main part of camera in respective embodiments according to the present invention.

FIG. 1 is a constitutional drawing to show a main part of a camera according to the present invention.

In FIG. 1, numeral 1 denotes a camera body, and 2 a film plane. Numeral 8 denotes a photo-taking lens, which is constituted by a focusing lens 4, a magnification change lens 5, and a blur correction optical system 6.

The focusing lens 4 is focus-adjusted by a focus actuator 32, and the magnification change lens 5 changes a focal length of the photo-taking lens 3 in a known magnification change operation. The blur correction optical system 6 is supported by an unrepresented mechanism as two-dimensionally independently movable on a plane vertical to an optical axis, and is eccentrically driven by two pairs of image blur correction actuators 26.

Numeral 7 designates a main mirror composed of a half mirror, which separates an optical flux entering from a photo-taking optical system into optical fluxes to a finder system and to a focus detection system. Numeral 8 designates a finder screen conjugate with a film plane 2, numeral 9 a pentagonal roof prism, and numeral 10 an eye piece having a beam splitter portion 10a. Numeral 11 represents a sub-mirror, which guides a transmission light through the main mirror 7 to a focus detection sensor 31.

Numeral 21 denotes a micro computer (as will be referred to a micro-computer), which is an one-chip micro-computer having functions of ROM, RAM, A/D conversion, and D/A conversion. The micro computer 21 executes operations of automatic exposure control, automatic focus adjustment, film winding, and later-described image blur correction and/or detection of sight axis direction of photographer in accordance with a sequence program stored in a ROM.

Numeral 22 designates an angular velocity meter for detecting a vibration of camera, which uses a so-called vibration gyroscope or the like. Numeral 23 denotes a high-pass filter, which eliminates a bias component and a drift component of long period in an output signal ω from the angular velocity meter 22 and outputs an angular velocity signal ω'. Numeral 24 denotes an integrator, which converts the angular velocity signal ω' into an angular displacement signal (deflection signal) θ.

The angular velocity meter 22, the high pass filter 23, and the integrator 24 are controlled by the micro-computer 21 in start, stop, and/or characteristic change through control lines S2, S3, and S4 therefrom.

Numeral 25 represents a driver circuit of the aforementioned image blur correction actuators 26. When the deflection signal θ detected by the integrator 24 is converted into a lens displacement signal d for blur correction in the micro-computer 21, the displacement signal d is supplied to the driver circuit 25 to drive the blur correction optical system 6. Numeral 27 denotes an infrared emitting diode (IRED), and 28 a position sensing device (PSD). These constitute a displacement detection system. They detect a displacement ($d_L$) of the blur correction optical system 6 driven by the driver circuit 25. The displacement signal $d_L$ is supplied to the micro-computer 21 as a feedback signal, thus constituting a feedback loop for displacement-controlling the blur correction optical system 6 with a control amount (displacement signal) d.

An image blur of camera is caused by vibrations in two directions, i.e., in the vertical (pitch) direction and in the horizontal (yaw) direction. Thus, two pairs of image blur correction elements, each of which is composed of the elements of from the angular velocity meter 22 to the PSD 28, are required, but only one pair thereof is shown in FIG. 1 for brevity of the drawing.

Numeral 31 is a focus detection sensor, and 32 a focus adjustment actuator.

Numeral 33 denotes a sight axis detection sensor composed of a two-dimensional (area) CCD or the like to detect a sight axis direction of a photographer, and 34 an infrared emitting diode (IRED) for illuminating a pupil of the photographer to detect a sight axis thereof.

A light emitted from the IRED 34 passes through a beam splitter 35 and an imaging lens 36, and is then reflected by the beam splitter 10a to illuminate the pupil of the photographer. Then, an image of the pupil illuminated and a cornea reflection image of the IRED 34 are focused through the beam splitter 10a, the imaging lens 36, and the beam splitter 35 on the sight axis detection sensor 33, thereby to detect whether the pupil of the photographer approaches the eye piece portion or not and to detect the sight axis direction in accordance with a predetermined algorithm.

Numeral 37 designates a photometry sensor for measuring a luminance of a subject.

Numeral 38 denotes a release operation control circuit, which controls a drive of an unrepresented motor for quick return control of the main mirror 7 and the sub-mirror 11, and a drive of an unrepresented magnet for aperture and shutter control.

Numeral 39 is a winding/charge control circuit, which controls a drive of an unrepresented motor for film winding and for shutter charge.

SWM denotes a main switch provided on an exterior member of the camera, which is turned on through a switch operation on a switch knob by a photographer or through an operation for the photographer to hold a grip of the camera. Once the main switch SWM is turned on, the micro-computer 21 starts executing a predetermined sequence program stored in the ROM.

SW1 and SW2 are switches synchronously associated with an unrepresented release button. A first step press on the release button turns on the switch SW1, and a second step press to follow the first step press turns on the switch SW2. The micro-computer CPU executes the photometry exposure calculation, the automatic focus adjustment operation, and the image blur correction operation with the turning-on of the switch SW1, and, the exposure control and the winding of film with the turning-on of the switch SW2 as a trigger.

Figure 2:
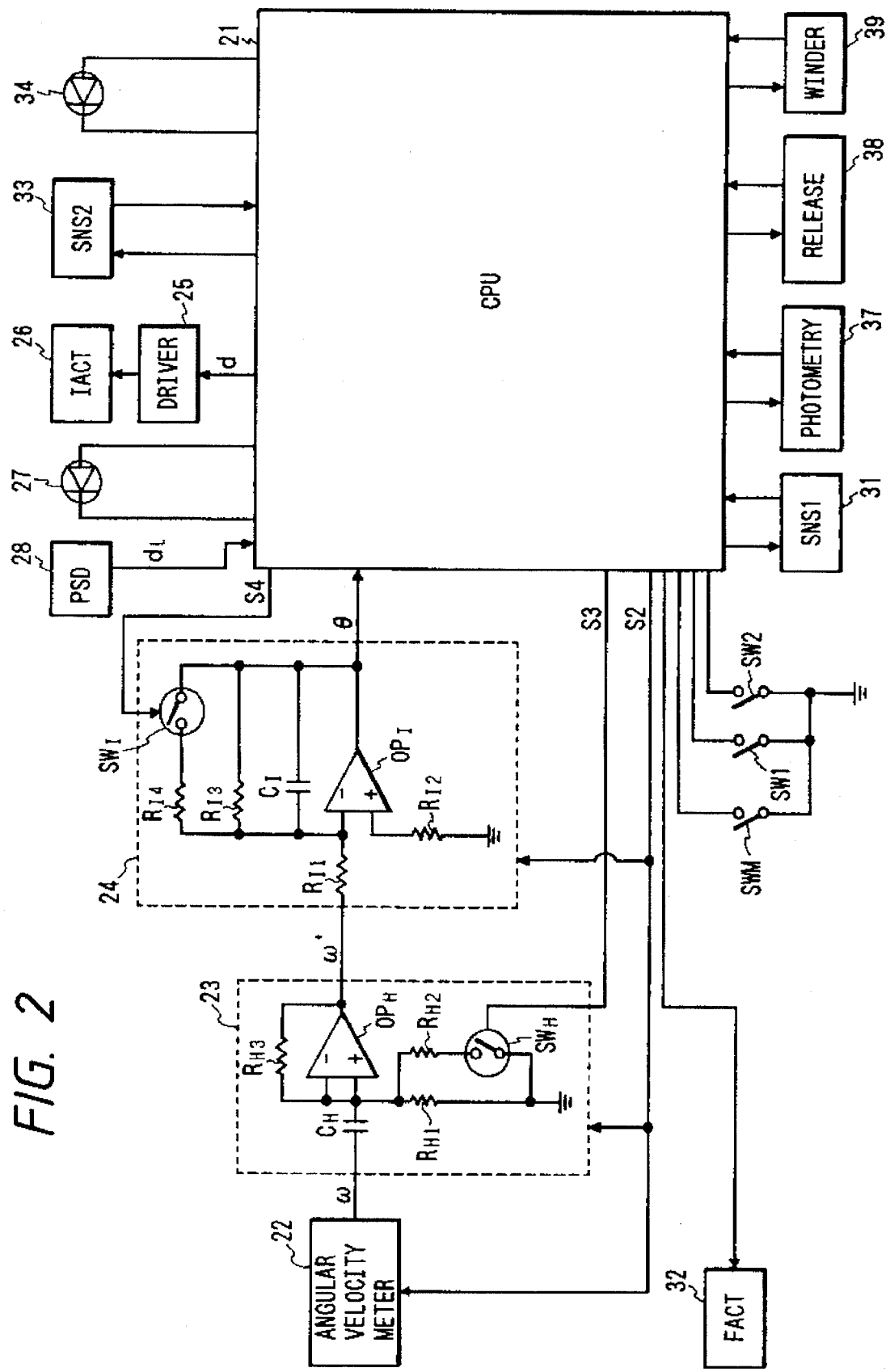
FIG. 2 is a circuit diagram to show a structure of a major part of FIG. 1.

FIG. 2 shows the control circuit section among the constituent elements in FIG. 1, and specifically describes in detail the high-pass filter 23 and the integrator 24.

The high-pass filter 23 comprises an operational amplifier $OP_H$, resistors $R_{H1}$ to $R_{H3}$, a capacitor $C_H$, and a switch $SW_H$ under an on-off control of the micro-computer 21. The switch $SW_H$ is usually in an off (open) state, and a poll or cut-off frequency $f_{H1}$ [Hz] in that state is as follows:

$$f_{H1}=1/(2\pi \times R_{H1} \times C_H).$$

Accordingly, when a angular velocity signal ω is input from the angular velocity meter 22, components below the frequency $f_{H1}$ [Hz] are cut off whereby an angular velocity signal ω' is output.

When the switch $SW_H$ is turned on through the control line S3 from the micro-computer 21, a cut-off frequency $f_{H2}$ is as follows:

$$f_{H2}=(R_{H1}+R_{H2})/(2\pi \times R_{H1} \times R_{H2} \times C_H) \leq f_{H1}.$$

In other words, when the switch $SW_H$ is turned on, the reducing cut property is enhanced to increase the offset elimination capacity for the angular velocity signal ω. Namely, the convergence time of the initial-value error may be shortened, and hand vibration signals of low frequencies may be cut-off.

The integrator 24 comprises an operational amplifier $OP_I$, resistors $R_{I1}$ to $R_{I4}$, a capacitor $C_I$, and a switch $SW_I$, similarly as the high-pass filter 25. When the switch $SW_I$ is off, an integration is conducted for signals over the following frequency:

$$f_{I1} 1/(2\pi \times R_{I3} \times C_I).$$

When the switch $SW_I$ is on, an integration is conducted for signals over the following frequency:

$$F_{I2}=(R_{I3}+R_{I4})/(2\pi \times R_{I3} \times R_{I4} \times C_I) \leq f_{I1}.$$

In other words, the integration effect is weakened in a low frequency range in the on state of the switch $SW_I$, so that the angular displacement signal (deflection signal) θ may be quickened to return to the origin with the turning-on of the switch $SW_I$ when a large deviation is caused for example by panning.

A combination of the angular velocity meter 22, the high-pass filter 23, and the integrator 24 will be referred to as vibration detecting means.

An operation of the thus-arranged camera is explained in the following with reference to FIGS. 3A and 3B.

Once an unrepresented power switch (which may be either a switch automatically switched by battery mounting, a switch to change over a power making circuit by manual operation, or a power mounting operation itself) is turned on, a power is supplied to the micro-computer 21. The micro-computer 21 proceeds from Step 001 to Step 002 as shown in FIG. 3A to start executing a predetermined program.

Cleared for initialization at Step 002 are all flags and variables for control as set in the RAM in the micro-computer 21.

At Step 003, a condition judgement of the main switch SWM is carried out. If the switch SWM is off, the flow returns to Step 002, repeating the above steps before the switch SWM is turned on while being in a standby condition. After that, when it is judged that the main switch SWM is turned on, the flow proceeds to Step 004.

A sight axis detection is conducted at Step 004. Specifically, the IRED 34 of FIG. 2 is turned on, and the sight axis detection sensor 33 starts storing an image in synchronism with that. After completion of the storage of image, an image signal is transferred to the micro-computer 21, and the micro-computer 21 executes a detection of presence or absence of a pupil image of photographer, and a detection of a sight axis direction in accordance with a predetermined algorithm. Details of the principle and algorithm of the detection are described in Japanese Patent Application Laid-open No. 1-241511, corresponding to U.S. Ser. No. 327,784 filed on Mar. 23, 1989 by the Assignee of the present application, and therefore omitted to explain here.

A judgement about the sight axis detection result is performed at Step 005. Since the present embodiment needs no information about the direction of sight axis, the judgement is only about presence or absence of pupil approach. If it is Judged that a pupil has approached (of course alternatively, if a result has been obtained about the determination of direction of sight axis), the flow goes to Step 006. Unless the approach of pupil is confirmed, the flow returns to Step 004 to repeat the sight axis detection.

The confirmation of approach of pupil means that a photo-taking preparation operation is in progress. Then, at Step 006, the micro-computer 21 makes the vibration detecting means, that is, the angular velocity meter 22, the high-pass filter 23, and the integrator 24, start operating through the control line S2 as shown in FIG. 2. Since an initial-value error as described above is included in the output signal (deflection signal) θ immediately after the operation start of the vibration detecting means, the switches $SW_H$, $SW_I$ are latched at Step 007 in the on state for early convergence of the initial-value error.

An on-off detection of the switch SW1 is executed at next Step 008. If the switch SW1 is off, the flow stays at Step 008 to repeat the detection of state of the switch SW1.

A reason why the switches $SW_H$, $SW_I$ are kept in the on state while the switch SW1 is off is as follows. If the deflection signal θ or the displacement signal d is converged at near "0", and when the image blur correction is started after Step 009. the blur correction optical system 6 starts being driven from near the origin (a point at which an optical axis of the blur correction optical system coincides with a photo-taking optical axis, that is, an optical axis passes through the center of the film plane), which may reduce quick motions of the blur correction optical system 6 at a start of blur correction and which may permit effective use of blur correction stroke.

If it is judged at Step 008 that the switch SW1 is on, the flow goes to Step 009, where the switches $SW_H$, $SW_I$ are made to be turned off to set the polls of the high-pass filter 23 and the integrator 24 at $f_{H1}$ and $f_{I1}$ to provide an ordinary hand vibration detection property.

An image blur correction is started at next Step 010. Specifically, the micro-computer 21 supplies the displacement signal d of the blur correction optical system 6 to the driver circuit 25 to make the driver circuit 25, the image blur correction actuators 26, the IRED 27, and the PSD 28 start operating, whereby driving the blur correction optical system 6 as to restrain the image blur on the film plane 2, or, on the finder screen 8.

At next Step 011, a luminance of a subject is measured by the photometry sensor 37. An aperture control value and a shutter second time control value are calculated in accordance with a predetermined program based on the luminance information.

At Step 012 to follow, a defocus amount of the subject is detected by the focus detection sensor 31. The actuator 32 is driven based on the detection result to perform a focus adjustment.

It is Judged at next Step 013 whether the switch SW2 is on or off. If the switch SW2 is off, the flow returns to Step 008 to repeat the above Steps 009 to 012. If the switch SW2 is on, the flow proceeds to Step 021.

An image blur correction control is executed at Step 021 in the same manner as at Step 010. This is because the image blur correction is necessary during release.

It is judged at next Step 022 whether the release operation is finished. If the operation is not finished yet, carried out at next Step 023 are the release control, i.e., the quick return control of the mirrors 7, 11, the aperture and shutter control, and the like. Then, the flow returns to Step 021.

Once the release control is completed by repeatedly executing the above Steps 021 to 023, the flow proceeds from Step 022 to Step 024, where it is judged whether the film winding and the shutter charge are finished. If the operations are not finished yet, the operations are carried out at Step 025. Then, the flow returns to Step 021.

When repetitive executions of Steps 021, 022, 024, and 025 conclude the film winding and the shutter charge, the release operation is finished. Then, the flow returns from Step 024 to Step 008.

The following is a summary of the operation of the camera as described above in the first embodiment according to the present invention:

(1) Starting the sight axis detection with turning-on of the main switch SWM (Step 001 to Step 004);

(2) Starting the operation of the vibration detecting means with recognition of the pupil approach (Step 005 to Step 007);

(3) Starting the image blur correction, the AE (exposure calculation), and the AF (focus adjustment) with turning-on of the switch SW1 (Step 008 to Step 012); and (4) Starting the release operation with turning-on of the switch SW2 (Step 013 to Step 025).

In the first embodiment, the detection of the photo-taking preparation operation completion of the photographer is made by the detection of presence or absence of a pupil image of a photographer. Other methods could be employed for the detection. For example, as shown in FIG. 3B, an alternative method may be so arranged that a reflection light from an object is measured by a light projection and reception system located near the eye piece to detect an approach of a face.

Figure 3A:
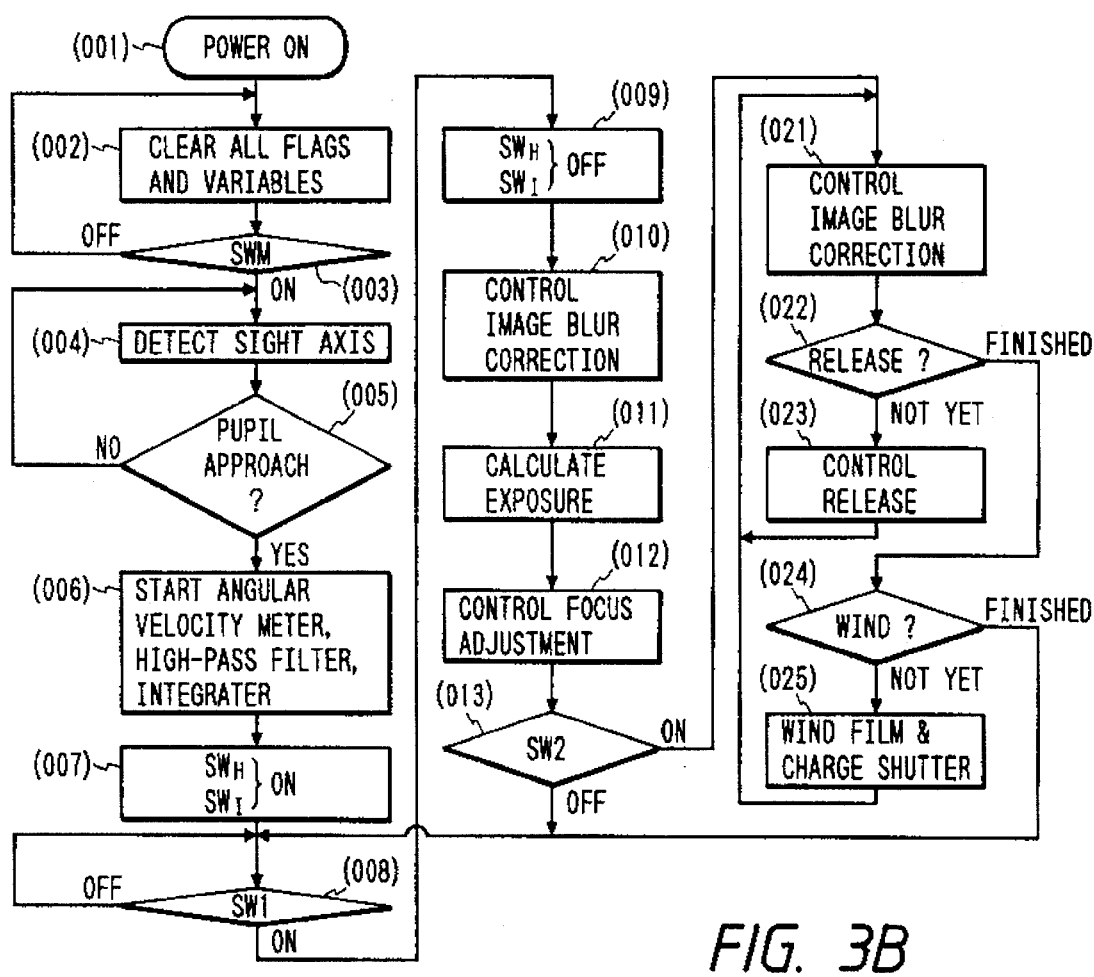
FIGS. 3A and 3B are flowcharts to show an operation of a camera in the first embodiment of the present invention.
Figure 3B:
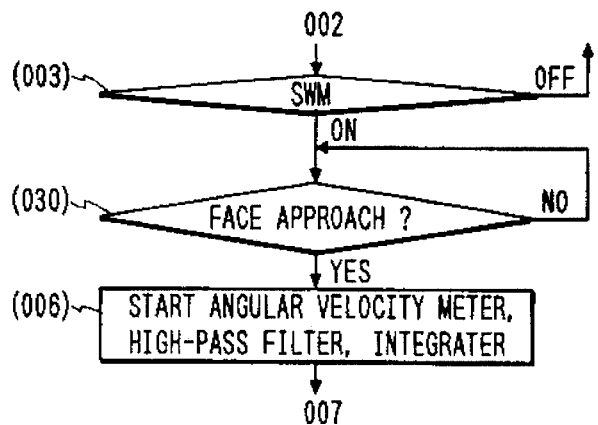

FIG. 3B shows the alternative method in which Steps 004 and 005 in the flowchart of FIG. 3A are substituted by Step 030 to detect a face approach by detection of the light projection and reception system. The other steps in the method of FIG. 3B are the same as those in FIG. 3A.

Second Embodiment

The operation of the vibration detecting means is started with recognition of the pupil approach in the above-described first embodiment, while both the operation of the vibration detecting means and the operation of the image blur correction are started with recognition of the pupil approach in the second embodiment of the present invention as will be explained below.

Each of FIGS. 4A and 4B is a flowchart to show an operation of the camera in the second embodiment of the present invention.

In the second embodiment, Steps 101 to 107 are identical to Steps 001 to 007 of the first embodiment as shown in FIG. 3A, and therefore only a point is explained about them.

If an on state of the main switch SWM is detected at Step 103 after the power is put in, the sight axis detection is carried out at Step 104. If a pupil approach is recognized in the sight axis detection, the flow proceeds from Step 105 to Step 106 to start the operation of the vibration detecting means. At Step 107, the switches $SW_H$, $SW_I$ are latched in the on state for early convergence of the initial-value error.

At next Step 108, an amplitude of a deflection signal $\theta$ is compared with a reference value $\theta_0$ to judge whether the signal is large or small. The reference value $\theta_0$ is a value preliminarily set in the micro-computer 21, for example which may be set at 20% of $\theta_{max}$ if a blur correction possible range is $\pm\theta_{max}$. If an absolute value of the deflection signal $\theta$ is larger than the reference value $\theta_0$, the flow remains at this step to wait before the deflection signal $\theta$ becomes smaller. If $|\theta|$ becomes not more than $\theta_0$, that is, if the initial-value error of the deflection signal $\theta$ is lowered, the flow goes to Step 109.

At Step 109, the switches $SW_H$, $SW_I$ are made to be turned off to provide the high-pass filter 23 and the integrator 24 with the ordinary hand vibration detection property. At Step 110, the image blur correction control is started.

At next Step 111, it is judged whether the switch SW1 is on or off. If the switch SW1 is off, the image blur correction is continued. When the switch is made to be turned on, the flow goes to Step 112.

At Step 112, the same exposure calculation is carried out as in the first embodiment. The focus adjustment control is conducted at Step 113, and then the flow goes to Step 114.

A judgement about a condition of the switch SW2 is made at Step 114. If the switch SW2 is in the off state, the flow returns to Step 110 and repeats the execution of Steps 110 to 113. After that, if the switch SW2 is made to be turned on, the flow goes from Step 114 to Step 112 to execute the same release operation as Steps 021 to 025 in the first embodiment.

The following is a summary of the operation of the camera as described above in the second embodiment of the present invention:

(1) Starting the sight axis detection with turning-on of the main switch SWM (Step 101 to Step 104);

(2) Starting the operation Of the vibration detecting means with the detection of pupil approach, and then starting the image blur correction control (Step 105 to Step 110);

(3) Starting the AE and the AF with turning-on of the switch SW1 (Step 111 to Step 113); and (4) Starting the release operation with turning-on of the switch SW2 (Step 114 to Step 125).

Although the convergence of the initial-value error is waited at Step 108 in the second embodiment, the step may be arranged to be timer means for delaying the flow before the detection value is stabilized. Namely, when a certain time elapses after the execution of Step 107, the flow may be arranged to proceed to Step 109.

FIG. 4B shows a flowchart of an alternative method in which Step 105 of the flowchart in FIG. 4A as described is substituted by Step 130 to detect a face approach, in the same idea as that in FIG. 3B. Further, Step 108 of FIG. 4A is substituted by Steps 131 and 132 to provide timer means as above described. The other steps are the same as those in FIG. 4A. In FIG. 4B, Step 131 is a step to start the above-described timer, and Step 132 is a step to detect that a predetermined relay time elapses.

Since the second embodiment is so arranged as to start the blur correction operation as well as the operation of the vibration detecting means with recognition of pupil approach, the image blur correction is already effective upon start of focus adjustment with turning-on of the switch SW1, and, therefore, the focus adjustment may be started after even a small subject is set in a distance measurement frame without vibration, whereby an error in distance measurement may be avoided.

Third Embodiment

The operation of the vibration detecting means is started with recognition of pupil approach in the first and the second embodiments, while the operation of the vibration detecting means is intended to start with turning-on of the main switch SWM in the third embodiment of the present invention as will be explained below.

Each of FIGS. 5A and 5B is a flowchart to show an operation of the camera in the third embodiment according to the present invention.

The third embodiment has execution contents of respective steps substantially identical to those in the first and the second embodiments, but the order of the steps is different. Accordingly, the details of the execution contents will be omitted to explain here.

After the power is put in, all flags and all variables are cleared at Step 202. If it is judged at Step 203 that the main switch SWM is on, the vibration detecting means is started to operate at Step 204. The switches $SW_H$, $SW_I$ are latched in the on state at Step 205 for early convergence of the initial-value error of the deflection signal θ.

The sight axis detection is carried out at Step 206. If the pupil approach is recognized, the flow goes to Step 208, while, if not, the flow returns to Step 206 to repeat the sight axis detection.

When the pupil approach is recognized, the vibration detection property is turned into an ordinary state at Step 208. The image blur correction is started at next Step 209. The exposure calculation is conducted at Step 210, the focus adjustment control at Step 211, and the judgement of the switch SW1 at Step 212. If the switch SW1 is off, the flow returns to Step 209 to repeat the execution of the image blur correction, the exposure calculation, and the focus adjustment control.

If it is judged at Step 212 that the switch SW1 is on, the flow goes to Step 213 to execute the image blur correction, and then proceeds to Step 214. It is judged at Step 214 whether the switch SW2 is on or off. If the switch SW2 is off, the flow returns to Step 212. In other words, if the switch SW1 is on, only the execution of the image blur correction is repeated, but the exposure calculation value and the focus condition are fixed at current states immediately before the switch SW1 becomes on, effecting the so-called AE lock and AF lock.

Once the switch SW2 is turned on, the flow moves from Step 214 to Step 221 to carry out the release operation similarly as in the first and the second embodiments.

The following is a summary of the operation of the camera in the third embodiment according to the present invention:

(1) Starting the vibration detecting means and also starting the sight axis detection with turning-on of the main switch SWM (Step 201 to Step 206);

(2) Starting the image blur correction, the AE operation, and the AF operation with detection of the pupil approach (Step 207 to Step 211);

(3) Locking the AE and the AF with turning-on of the switch SW1 (Step 212 to Step 213); and (4) Starting the release operation with turning-on of the switch SW 2 (Step 214 to Step 225).

The detection of the photo-taking preparation operation of the photographer is carried out by the detection of presence or absence of a pupil image of the photographer in the third embodiment, but another method may be employed for the detection. For example, as shown in FIG. 5B, the detection may be conducted by such a method that a reflection light from an object is measured by a light projection and reception system disposed near the eye piece to detect an approach of a face.

FIG. 5B shows a flowchart of an alternative method in which Steps 206 and 207 in the flowchart of FIG. 5A as described are substituted by Step 230 to detect an approach of a face by detection of the light projection and reception system and the other steps are equal to those in FIG. 5A.

An operation start timing of the vibration detecting means is earlier in the third embodiment than in the first and the second embodiments, so that a dissipation amount of camera power slightly increases, but an earlier start of image blur correction may be made.

FIG. 6 summarizes the operations as described in the above three embodiments.

Fourth Embodiment

Figure 7A:
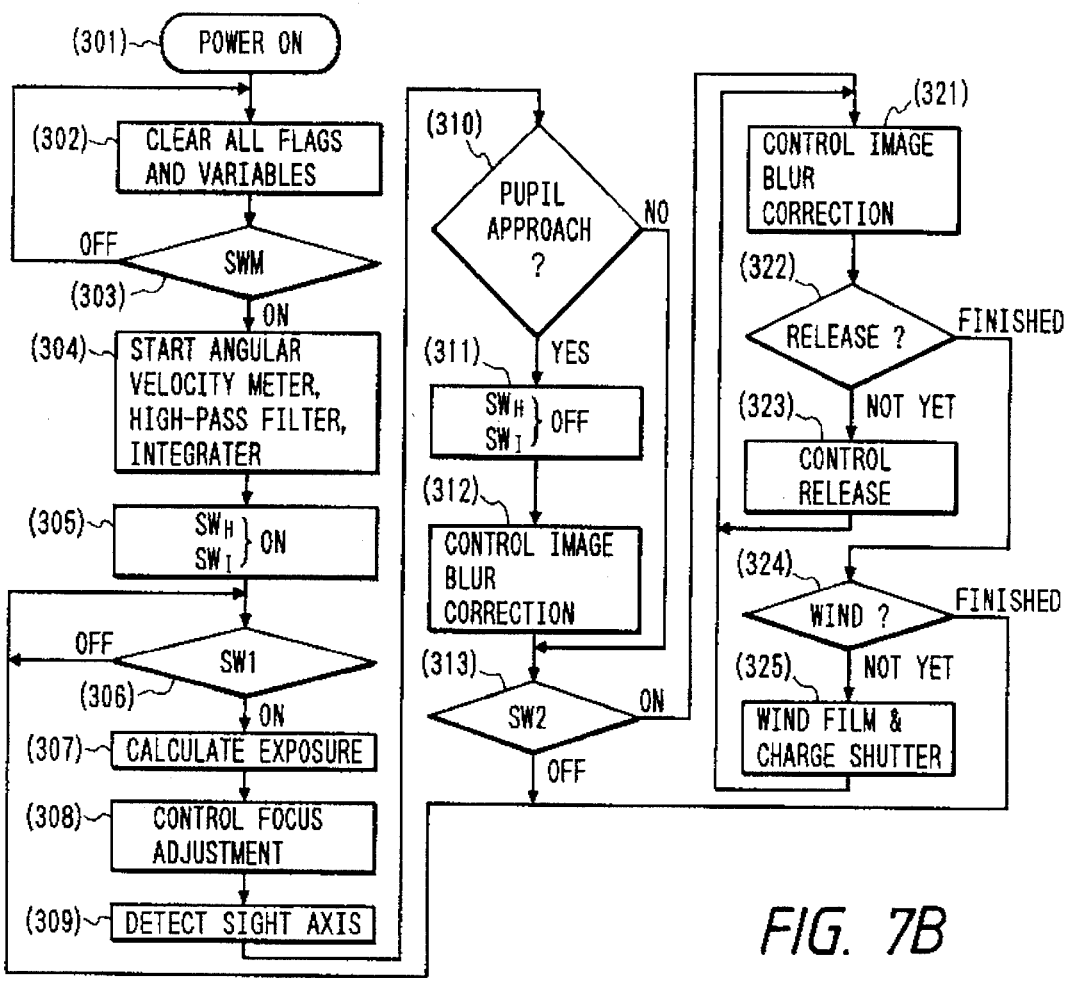
FIGS. 7A and 7B are flowcharts to show an operation of a camera in the fourth embodiment of the present invention.
Figure 7B:
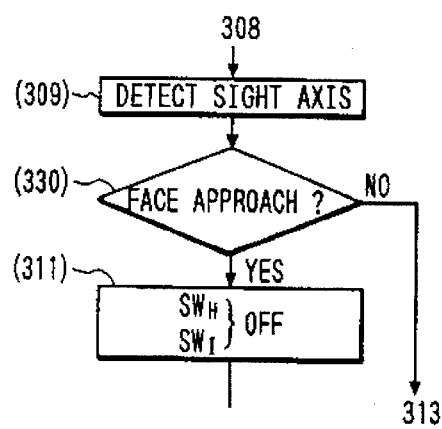

FIGS. 7A and 7B are flowcharts to show an operation in the fourth embodiment according to the present invention. In this embodiment, the image blur correction operation is effected only if a photographer needs the image blur correction.

When the unrepresented power switch is turned on, the power is supplied to the micro-computer 21. The micro-computer 21 proceeds from Step 301 to Step 302 to start the execution of a predetermined program.

At Step 302, all flags and variables for control, which are set in the RAM in the micro-computer 21, are cleared for initialization.

A judgement of the condition of the main switch SWM is carried out at Step 303. If the switch SWM is off, the flow returns to Step 302 to repeat the above steps before the switch SWM is turned on while being in a standby state. After that, when it is Judged that the main switch SWM is on, the flow goes to Step 304.

At Step 304, the vibration detecting means, that is, the angular velocity meter 22, the high-pass filter 23, and the integrator 24, is started to operate through the control line S2 from the micro-computer 21 as shown in FIG. 2. Since an output signal (deflection signal) θ includes an initial-value error as described above immediately after the operation start of the vibration detecting means, the switches $SW_H$, $SW_I$ are latched at next Step 305 in the on state for early convergence of the initial-value error.

An on-off detection of the switch SW1 is then carried out at Step 306. If the switch SW1 is off, the flow remains at Step 306 to repeat the condition detection of the switch SW1.

A reason why the switches $SW_H$, $SW_I$ are kept in the on state while the switch SW1 is off is as follows. If the deflection signal θ, or the displacement signal d is converged at near "0" and when the image blur correction is started after Step 307, the blur correction optical system 6 is driven for blur correction from near the origin so as to reduce quick motions of the blur correction optical system 6 upon start of the blur correction and to effectively use the blur correction stroke.

If it is Judged at above Step 206 that the switch SW1 is on, the flow goes to Step 307.

At Step 307, a luminarice of a subject is measured by the photometry sensor 37, and an aperture control value and a shutter second time control value are calculated in accordance with the predetermined program based on the luminance information.

Then at Step 308, a defocus amount of the subject is detected by the focus detection sensor 31, and the focus adjustment is made by driving the actuator 32 based on the result of the detection.

The sight axis detection is carried out at next Step 309. Specifically, the IRED 34 of FIG. 2 is turned on, and the sight axis detection sensor 33 starts storing an image in synchronism with that. After completion of the image storage, an image signal is transferred to the micro-computer 21. The microcomputer 21 executes detections of presence or absence of a pupil image of the photographer and of sight axis direction in accordance with a predetermined algorithm.

A judgement is made about the above sight axis detection result at Step 310. Since this embodiment needs no information about the sight axis direction, only the presence or absence of pupil approach is required to know. Then, if it is Judged for a pupil to approach the flow goes to Step 311, while if the pupil approach is not recognized the flow goes to Step 313.

It is Judged at Step 313 whether the switch SW2 is on or off. If the switch SW2 is off, the flow returns to Step 306 to repeat the flow between above Step 307 and Step 310. In other words, when the switch SW1 is on but if the pupil approach is not recognized, only the exposure calculation and the focus adjustment control are repeated without execution of the image blur correction.

If the pupil approach is recognized at above Step 310, the flow proceeds to Step 311 to make the switches $SW_H$, $SW_I$ off thereby to set the polls of the high-pass filter 23 and of the integrator 24 at $f_{H1}$ and $f_{I1}$, providing the ordinary hand vibration detection property.

The image blur correction is then started at Step 312. Specifically, the micro-computer 21 transfers the displacement signal d of the blur correction optical system 6 to the driver circuit 25 to make the driver circuit 25, the image blur correction actuators 26, the IRED 27, and the PSD 28 start operating and then to drive the blur correction optical system 6, whereby restraining the image blur on the film plane 2, or on the finder screen 8. Then, the flow proceeds to Step 313. If the switch SW2 is off the flow returns to Step 306 as described above to repeat the execution of above Steps 307 to 312. Namely, the image blur correction is made only if the pupil approach is recognized after the switch SW1 is turned on.

If the switch SW2 is turned on during the execution of the flow between above Step 306 and Step 313, the flow goes from Step 313 to Step 321 to execute the release operation, that is, the quick return control of the mirrors 7, 11, the aperture and shutter control, the film winding, and the like.

In detail, the image blur correction control is carried out at Step 321 similarly as at Step 310. This is because the image blur correction is necessary during the release.

It is judged at next Step 322 whether the release operation is finished or not. If the release operation is not finished yet, the release control, that is, the quick return control of the mirrors 7, 11 and the aperture and shutter control are carried out at next Step 323, and then the flow returns to Step 321.

Once the release control is finished after repeating the execution of above Steps 321 to 323, the flow goes from Step 322 to Step 324 to Judge whether the film winding and the shutter charge are finished or not. If the operations are not finished yet, the operations are carried out at Step 325, and then the flow returns to Step 321.

The completion of the film winding and the shutter charge after repeating the execution of Steps 321, 322, 324, and 325 means the completion of all the release operation, and thus the flow returns from Step 324 to Step 306.

FIG. 8 summarizes the operation of the above flow.

FIG. 8 shows presence or absence of the operations of the exposure calculation (AE) and the focus adjustment control (AF) and presence or absence of the image blur correction operation in a combination of the on-off condition of the switch SW1 with presence or absence of the pupil approach, in which "presence" is represented by "O" and "absence" by "X".

The AE, the AF, and the image blur correction are not carried out whether or not the pupil approach is present if the switch SW1 is off. In case that the switch SW1 is on, the AE and the AF are carried out whether or not the pupil approach is present, but the image blur correction is carried out only if the pupil approach is recognized.

As so arranged, the image blur correction is effected only when a photographer needs the image blur correction, which is convenient for use and effective in prevention of waste power dissipation. Further, while a photographer walks as holding a grip of camera with a power of camera being put in, it is fully conceivable that the photographer accidentally touches the release button to start the image blur correction. Since the camera has a great vibration in such a motion, the image blur correction operation in this occasion would have severe motions, possibly resulting in breakage of the apparatus. Such a possibility may be eliminated by the arrangement of this embodiment.

As seen in the flow of FIGS. 7A and 7B, the image blur correction is always carried out upon the release whether or not the pupil approach is present.

Although the detection of the photo-taking preparation operation completion of the photographer is based on the detection of presence or absence of the pupil image of the photographer in the fourth embodiment, other methods may be employed for the detection. For example, as shown in FIG. 7B, an alternative method may be so arranged that a reflection light from an object is measured by a light projection and reception system disposed near the eye piece to detect an approach of a face.

FIG. 7B shows a flow in which Step 310 in the flowchart of FIG. 7A as described above is substituted by Step 330 to detect an approach of a face by detection of the light projection and reception system, and in which the other steps are identical to those in FIG. 7A.

Fifth Embodiment

In the fourth embodiment as described, the AE and the AF are not executed whether or not the pupil approach is present, if the switch SW1 is off. In the fifth embodiment, the AE and the AF are started when the pupil approach is recognized, even if the switch SW1 is off, whereby providing a camera superior in catching a shutter chance.

Figure 9A:
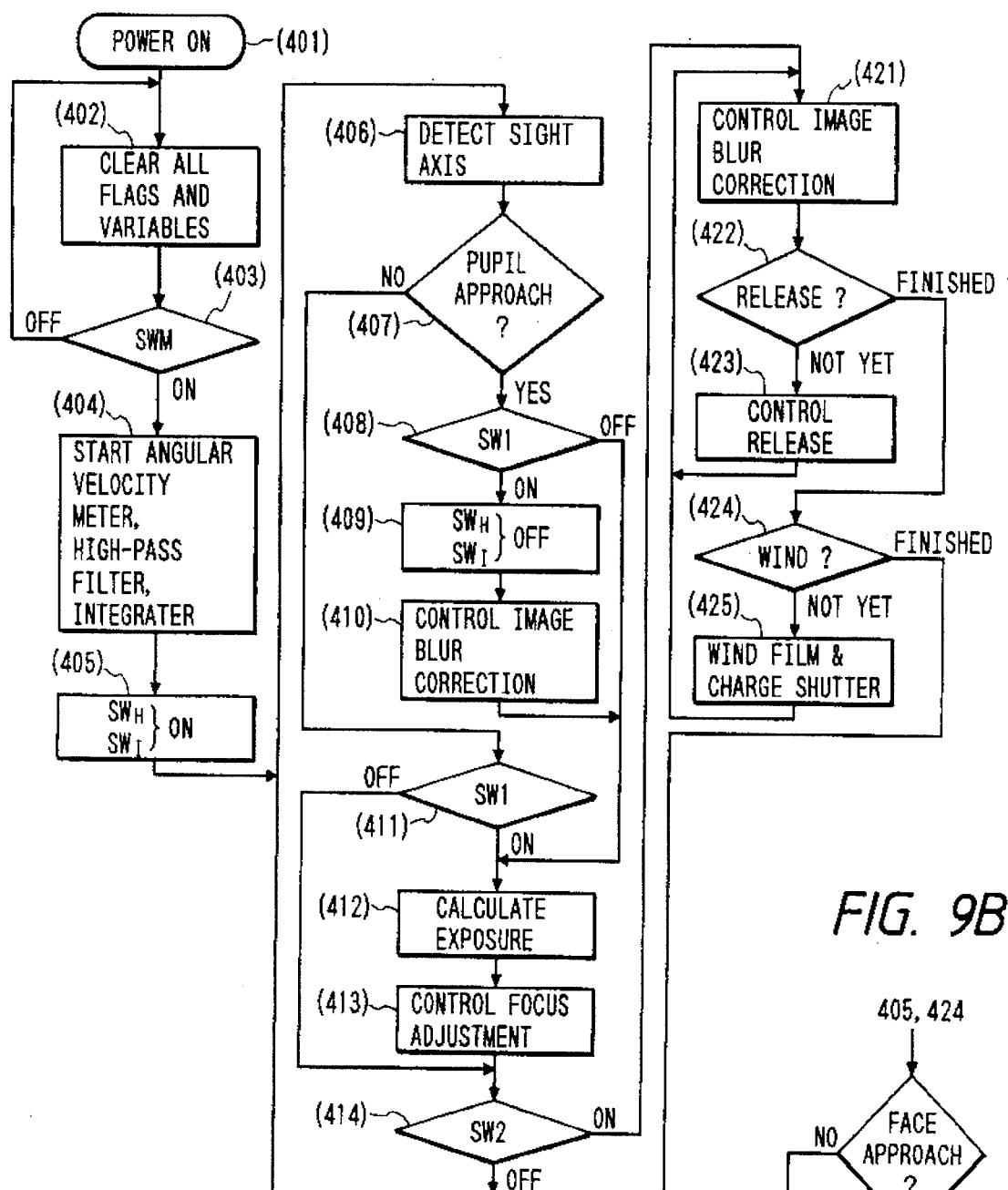
FIGS. 9A and 9B are flowcharts to show an operation of a camera in the fifth embodiment of the present invention.
Figure 9B:
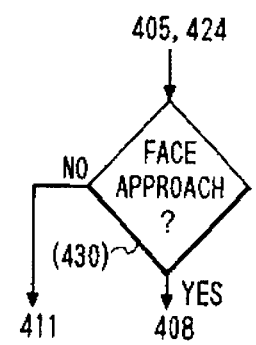

FIGS. 9A and 9B are flowcharts to show an operation in the fifth embodiment of the present invention.

Execution contents of respective steps are substantially identical to those in the fourth embodiment, but only the order of execution is different. Therefore, the steps are simply explained in the following.

Steps 401 to 405 are the same as Steps 301 to 305 in the fourth embodiment. In detail, after the power is put in and if the main switch SWM is turned on, the flow proceeds from Step 403 to Step 404 to start operating the vibration detecting means. At Step 405, the switches $SW_H$, $SW_I$ are latched in the on state for convergence of the initial-value error.

The sight axis detection is then started at Step 406. If the pupil approach is not recognized yet, the flow goes from Step 407 to Step 411 to execute a judgement about the switch SW1. If the switch SW1 is off, the flow goes to Step 414 to execute a judgement about the switch SW2. If the switch SW2 is off, the flow returns to Step 406 to repeat the execution of Steps 406, 407, 411, and 414.

Once the pupil approach is recognized during the execution of the above flow, the flow goes from Step 407 to Step 408. If the switch SW1 is off at Step 408, the flow proceeds to Step 412 to carry out the exposure calculation and then to Step 413 to execute the focus adjustment control. Then, if the switch SW2 is off, the flow returns from Step 414 to Step 406.

If it is judged at Step 407 that no pupil approach is recognized, the flow goes to Step 411. If it is judged at Step 411 that the switch SW1 is on, the exposure calculation and the focus adjustment control are also carried out.

If the pupil approach is recognized at Step 407 and if the switch SW1 is judged to be on at Step 408, the switches $SW_H$, $SW_I$ are made to be turned off at Step 409. Then, the image blur correction is performed at Step 410, and the flow proceeds to Step 412. Further, the exposure calculation is carried out at Step 412, the focus adjustment control is at Step 413, and then the flow returns from Step 414 to Step 406. In summary, the image blur correction is started only if both the pupil approach and the on state of the switch SW1 are confirmed.

If the switch SW2 is turned on during the execution of above Steps 406 to 411, the flow goes from Step 414 to Step 421 to start the release operation, and returns to Step 406 after the completion of the release operation, similarly as in the fourth embodiment.

Although the detection of the photo-taking preparation operation completion of the photographer is carried out by the detection of presence or absence of a pupil image of the photographer in the fifth embodiment, other methods may be employed for the detection. For example, as shown in FIG. 9B, an alternative method may be so arranged that a reflection light from an object is measured by a light projection and reception system disposed near the eye piece to detect an approach of a face.

FIG. 9B shows a flow in which Step 409 in the flowchart of FIG. 9A as described is substituted by Step 430 to detect an approach of a face by detection of the light projection and reception system and the other steps are the same as those in FIG. 9A.

FIG. 10 summarizes the operation of the fifth embodiment.

Sixth Embodiment

In the following sixth embodiment, the image blur correction is started irrespective of the condition of the switch SW1, once the pupil approach is recognized.

Figures 11A, 11B:
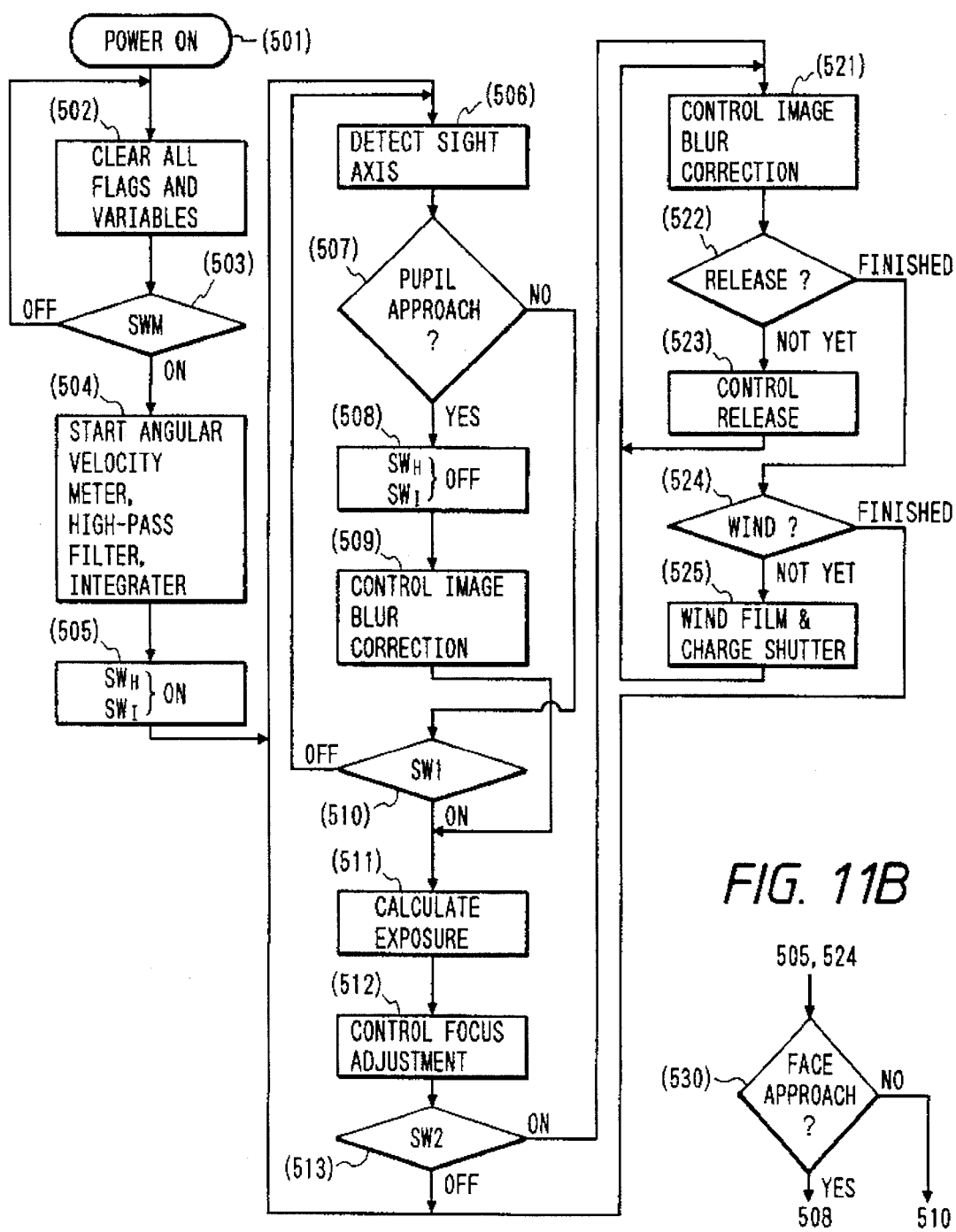
FIGS. 11A and 11B are flowcharts to show an operation of a camera in the sixth embodiment of the present invention.

FIGS. 11A and 11B are flowcharts to show an operation in the sixth embodiment according to the present invention.

Steps 501 to 505 are the same flow as in the fifth embodiment, and therefore are omitted to explain here.

The sight axis detection is carried out at Step 506. If the pupil approach is recognized at Step 507, the flow goes to Step 508. After the image blur correction is started at Steps 508 and 509, the flow proceeds to Step 511 to execute the exposure calculation and then to Step 512 to execute the focus adjustment control. Then, the flow goes to Step 513. At Step 513, judgement is conducted about the switch SW2. If the switch SW2 is off, the flow returns to Step 506.

If no pupil approach is recognized at Step 507, the flow goes to Step 510 to execute a judgement about the switch SW1. If the switch SW1 is off, the flow returns to Step 506. If the switch SW1 is on, Steps 511 and 512 are executed, and then the flow goes to Step 513.

If the switch SW2 is turned on during the execution of above Steps 506 to 513, the flow goes from Step 513 to Step 521 to start the release operation, and then returns to Step 506 after the completion of the release operation, similarly as in the first and the second embodiments.

Although the detection of the photo-taking preparation operation completion of the photographer is carried out by the detection of presence or absence of a pupil image of the photographer, other methods may be employed for the detection. For example, as shown in FIG. 11B, an alternative method may be so arranged that a reflection light from an object is measured by a light projection and reception system disposed near the eye piece to detect an approach of a face.

FIG. 11B shows a flow in which Step 507 in the flowchart of FIG. 11A as described above is substituted by Step 530 to detect an approach of a face by detection of the light projection and reception system and the other steps are the same as in FIG. 11A.

FIG. 12 summarizes the operation of the sixth embodiment.

In the above fourth to sixth embodiments, the AE, the AF, and the image blur correction are started with a trigger both of the turning-on of the switch SW1 and of the pupil approach. Features common to these three embodiments are as follows:

—The AE and the AF are more frequently operated as compared to the image blur correction; and —The image blur correction is not effected unless either the pupil approach or the face approach is recognized.

These features are based on the following circumstances:

—The image blur correction would be sufficiently effected if it is operated at least upon the release, while the AE and the AF must be finished before the release. Accordingly, the AE and the AF are required to start operating before the image blur correction;

—A role of the image blur correction before the release is to make a photographer confirm the image blur correction effect. Accordingly, the image blur correction would be meaningless unless the photographer is observing the finder. On the contrary, in photography with use of tripod, a photographer could release the shutter without observing the finder after decision of framing. The AE and the AF are necessary for such a photography. It is, therefore, suitable that the AE and the AF are always effected if the switch SW1 is on; and —The image blur correction apparatus needs a large power dissipation amount, and it is thus desired that the apparatus is not kept working unless necessary.

Seventh Embodiment

In the seventh embodiment, the AE, the AF, and the image blur correction are carried out only if both the turning-on of the switch SW1 and the pupil approach are confirmed. Comparing with the fourth to sixth embodiments as described above, the seventh embodiment is slightly disadvantageous in respect of readiness to a shutter chance, because a chance of the AF is less. However, the seventh embodiment may lower the possibility of an error operation of the focus adjustment device for example by an accidental contact with the switch SW1.

Figure 13A:
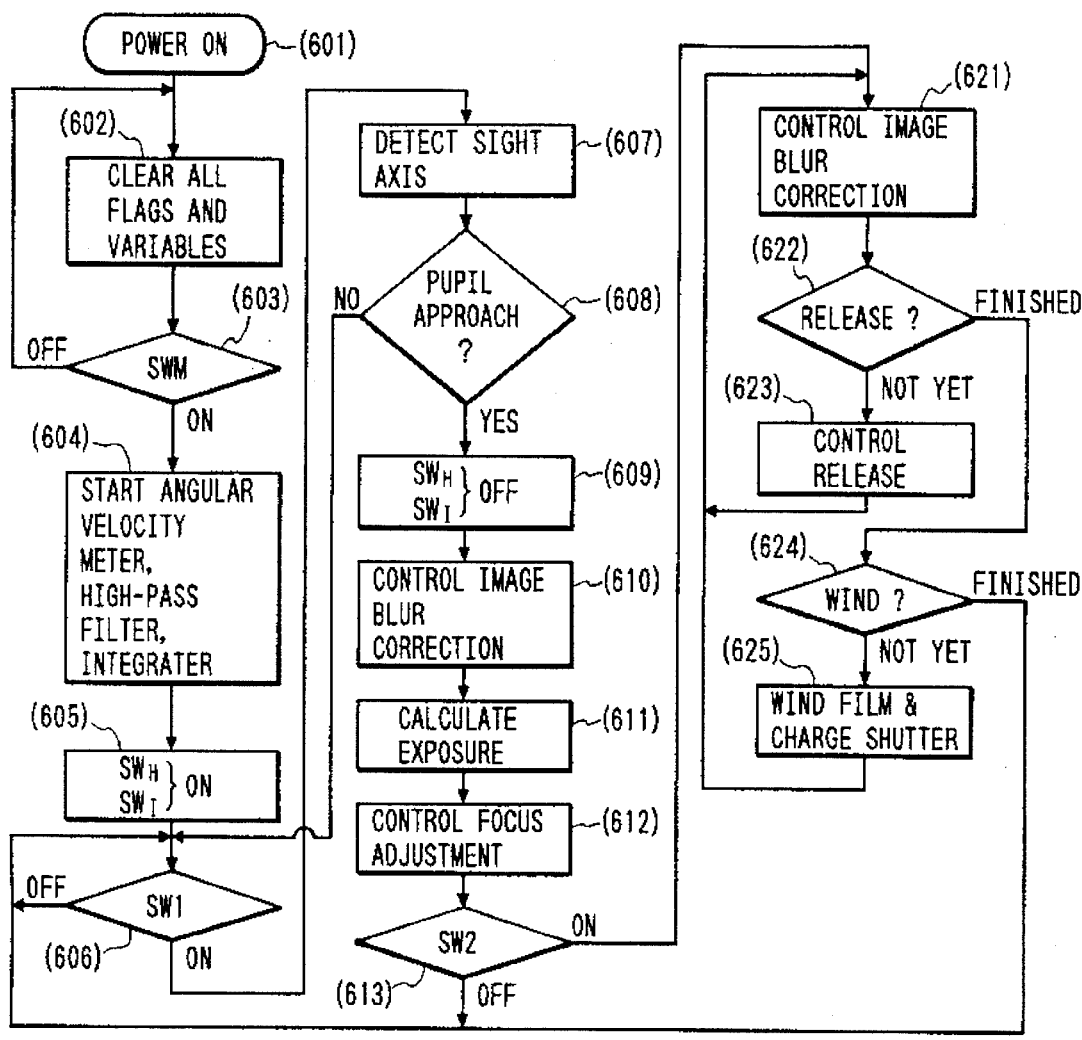
FIGS. 13A and 13B are flowcharts to show an operation of a camera in the seventh embodiment of the present invention.
Figure 13B:
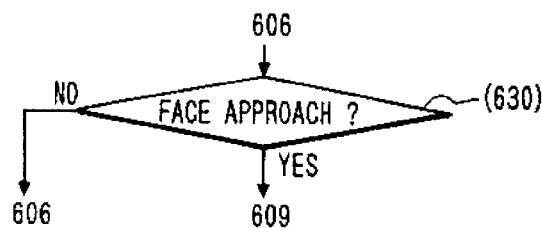

FIGS. 13A and 13B are flowcharts to show an operation in the seventh embodiment according to the present invention. The flow of FIGS. 13A and 13B are different from that of FIGS. 7A and 7B only in that Steps 307 to 312 of the fourth embodiment in FIGS. 7A and 7B are substituted by Steps 607 to 612, and therefore only a point is explained in the following.

If the switch SW1 is judged at Step 606 to be on, and only if the pupil approach is recognized at Step 608, Steps 609 to 612 are executed to effect the AE, the AF, and the image blur correction control.

Although the detection of the photo-taking preparation operation completion of the photographer is carried out by the detection of presence or absence of a pupil image of the photographer in the seventh embodiment, other methods may be employed for the detection. For example, as shown in FIG. 13B, an alternative method may be so arranged that a reflection light from an object is measured by the light projection and reception system disposed near the eye piece to detect an approach of a face.

FIG. 13B shows a flow in which Step 608 in the flowchart of FIG. 13A as described above is substituted by Step 630 to detect an approach of a face by detection of the light projection and reception system and the other steps are identical to those in FIG. 13A.

FIG. 14 summarizes the operation of the seventh embodiment.

Eighth Embodiment

Figure 15:
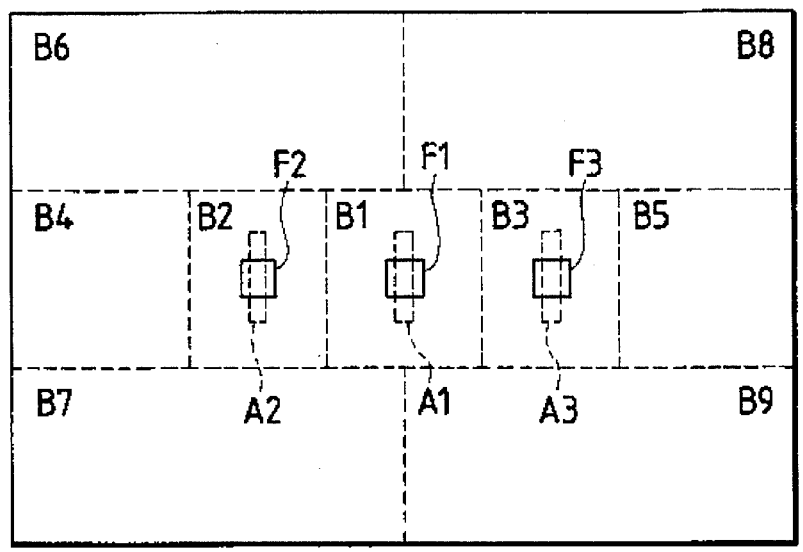
FIG. 15 is a plan view to show a view on a finder screen in the eighth and the ninth embodiments of the present invention.

FIG. 15 is a plan view of the finder screen 8 as shown in FIG. 1.

The focus detection sensor 31 of FIG. 1 has plural, for example three, distance measurement regions which have respective positions A1, A2, and A3 on the finder screen 8. There are distance measurement frames F1, F2, and F3 formed on the finder screen 8 as position indices of the respective distance measurement regions. A photographer sets a subject in the frames F1, F2, F3 to make the focus detection.

The sight axis detection sensor 33 is a two-dimensional (area) sensor, as explained above, which is so positioned as to detect a sight axis direction of a pupil of a photographer on the finder plane. The sight axis direction of the pupil detected is identified by regions of B1 to B9 divided by broken lines in FIG. 15. B1, B2, and B3 are regions corresponding to the distance measurement frames F1, F2, and F3; B4 and B5 two side regions thereof; and B6 to B9 detection regions on the top and on the bottom. There is no border given on a light acceptance plane of the sight axis detection sensor, but sight axis directions detected are merely classified into the above regions. Also, there is no indication about the border on the finder screen 8.

An operation in the eighth embodiment according to the present invention is explained in the following with reference to the flowchart of FIG. 16.

After the unrepresented power switch is turned on, a power is also supplied to the micro-computer 21. The micro-computer 21 starts executing a predetermined program, proceeding from Step 701 to Step 702.

At Step 702, all flags and variables for control, which are set in the RAM in the micro-computer 21, are cleared for initialization.

It is judged at Step 703 whether the main switch SWM is on. If the switch SWM is off, the flow returns to Step 702, to repeat the execution of the above steps before the switch SWM is turned on while being in a standby condition. After that, if it is judged that the main switch SWM is on, the flow goes to Step 704.

At Step 704, the vibration detecting means, that is, the angular velocity meter 22, the high-pass filter 23, and the integrator 24, is made to operate through the control line S2 from the micro-computer 21 as shown in FIG. 2. The switches $SW_H$, $SW_I$ are latched at Step 705 in the on state for early convergence of the initial-value error, because an output signal (deflection signal) θ includes the initial-value error as explained above immediately after the operation start of the vibration detecting means.

At next Step 706, a free-running timer TIMER built in the micro-computer 21 is reset to an initial-value ("0").

An on-off detection of the switch SW1 is carried out at next Step 707. If the switch SW1 is off, the flow returns to Step 705 to repeat the condition detection of the switch SW1 while executing Steps 705 and 706.

A reason why the switches $SW_H$, $SW_I$ are kept in the on state while the switch SW1 is off is as follows. If the deflection signal θ, or, the displacement signal d is converged at near "0" and when the image blur correction is started after next Step 708, the blur correction optical system 6 is driven for blur correction from near the origin, which may reduce quick motions of the blur correction optical system 6 upon start of the blur correction and effectively use the blur correction stroke.

If it is judged at above Step 707 that the switch SW1 is on, the flow proceeds to Step 708.

The switches $SW_H$, $SW_I$ are made to be turned off at Step 708 to set the polls of the high-pass filter 23 and of the integrator 24 at $f_{H1}$ and $f_{I1}$, providing the ordinary hand vibration detection property.

The image blur correction is started at Step 709. Specifically, the micro-computer 21 transfers the displacement signal d of the blur correction optical system 6 to the driver circuit 25 to start operating the driver circuit 25, the image blur correction actuators 26, the IRED 27, and the PSD 28 and then to drive the blur correction optical system 6, whereby restraining an image blur on the film plane 2, or, on the finder screen 8.

The sight axis detection is carried out at next Step 710. Specifically, the IRED 34 of FIG. 2 is turned on, and the sight axis detection sensor 33 starts storing an image in synchronism with that. After completion of the image storage, an image signal is transferred to the micro-computer 21, and the microcomputer 21 executes detections of presence or absence of a pupil image of a photographer and of sight axis direction in accordance with a predetermined algorithm.

It is judged at Step 711 whether a sight axis direction of the photographer is detected, that is, whether the sight axis direction is in either of the regions B1 to B9 in FIG. 15. If a sight axis direction Is correctly detected, the flow goes to Step 712. If not detected, the flow returns to Step 709 to repeat the image blur correction and the sight axis detection.

At Step 712, a separation is conducted depending upon the direction Judgement of the sight axis. If the sight axis direction of the photographer is within the region B1 of FIG. 15 or at the center, the flow goes to Step 713 to make the switch $SW_I$ turned off, thereby providing the ordinary hand vibration detection property. This is because it is assumed that, when the photographer observes the center of the finder screen, the panning or the like must not be in progress but only the hand vibration would occur.

The timer TIMER is reset to "0" at Step 714, and then the flow goes to Step 721.

If the sight axis direction is not in the region B1 at above Step 712, the flow goes to Step 715 to judge a metering time by the timer TIMER. The metering time is an elapsed tlme after the timer TIMER is reset at Step 706 or Step 714. If a value of the timer TIMER is a predetermined tlme, for example one second or more, the flow goes to Step 716 to turn on the switch $SW_I$. In other words, provided that the sight axis direction of the photographer is away from the central region B1 for a time over the predetermined time, the poll of the integrator 24 is increased judging the panning or the framing change is in the way, whereby the Integration effect of deflection signals with low frequency and large amplitude, which are caused by the panning or the like, is diminished not as to interfere the panning operation.

If the value of the timer TIMER is not more than one second at Step 715, Step 716 is not executed.

After executing Step 714 or, Steps 715 and 716, the flow goes to Step 721.

At Step 721, a luminance of a subject is measured by the photometry sensor 37, and the aperture control value and the shutter second time control value are calculated according to a predetermined program based on the luminance information.

The focus adjustment control is then carried out at Step 722. In this embodiment, the focus detection area includes the three regions A1, A2, A3 of FIG. 15. If the sight axis detection result shows that either one of the regions B1, B2, B3 is detected, a distance measurement region corresponding to the sight axis area is selected to perform the focus detection. If the sight axis detection result is an area except the regions B1, B2, B3, the central distance measurement region A1 is selected to perform the focus detection. Then, a defocus amount and a lens drive amount are calculated from the detection result to make the focus adjustment by driving the actuator 32.

The on-off detection of the switch SW1 is carried out at Step 723. The flow goes to Step 724 if the switch SW1 is kept in the on state, while the flow returns to Step 705 if the switch SW1 is off.

The on-off judgement of the switch SW2 is carried out at Step 724. If the switch SW2 is off, the flow returns to Step 709 to repeat the flow of above Steps 709 to 724. If the switch SW2 is turned on, the flow goes to Step 731 to execute the release operation, that is, the quick return control of the mirrors 7, 11, the aperture and shutter control, and the film winding.

In detail, the switch $SW_I$ of the integrator 24 is turned off at Step 731, and then the image blur correction is carried out at Step 732. This is because the image blur correction is necessary during the release.

It is judged at next Step 733 whether the release operation is finished. If the release operation is not finished yet, the release control, that is, the quick return control of the mirrors 7, 11, the aperture and shutter control, and the like, is executed at Step 734. Then the flow returns to Step 721.

Once the release control is finished by repeating the execution of above Steps 731 to 734, the flow goes from Step 733 to Step 735 to perform a judgement about whether the film winding and the shutter charge are finished. If the operations are not finished yet, the operations are carried out at Step 736. The flow then returns to Step 731.

When the film winding and the shutter charge are finished by repeating the execution of Steps 731, 732, 733, 735, and 736, the release operation is finished. Thus, the flow returns from Step 735 to Step 709.

To summarize the above flow, the vibration detecting means is started operating at Step 704 when the main switch SWM is turned on at Step 703, and the timer TIMER is reset at Step 706. Then, when the switch SW1 is turned on, the image blur correction is started at Step 709 and the sight axis detection is carried out at Step 710. If the sight axis direction is at the center of screen, the ordinary hand vibration detection property is given at Steps 713 and 714. In contrast, if the sight axis direction is away from the center for more than the predetermined time, the hand vibration detection property not interfering the panning operation is given at Step 716.

Ninth Embodiment

The vibration detection property is switched between two modes depending upon whether the sight axis direction of photographer is at the center of the finder screen or not in the above eighth embodiment, while the vibration detection property is continuously changed depending upon a change of sight axis direction in the ninth embodiment as explained below.

This embodiment also employs the circuit of FIG. 2. In the eighth embodiment, the micro-computer 21 controls the switches $SW_H$, $SW_I$ to be turned either on or off through the control lines S2, S3. In the ninth embodiment, the micro-computer 21 has a PWM (Pulse Width Modulation) circuit to perform a high speed on-off control of the switches $SW_H$, $SW_I$ at a predetermined duty ratio through the control lines S2, S3. The polls of the high-pass filter 23 and of the integrator 24 may be continuously changed by changing the duty ratio accordingly.

Figure 17:
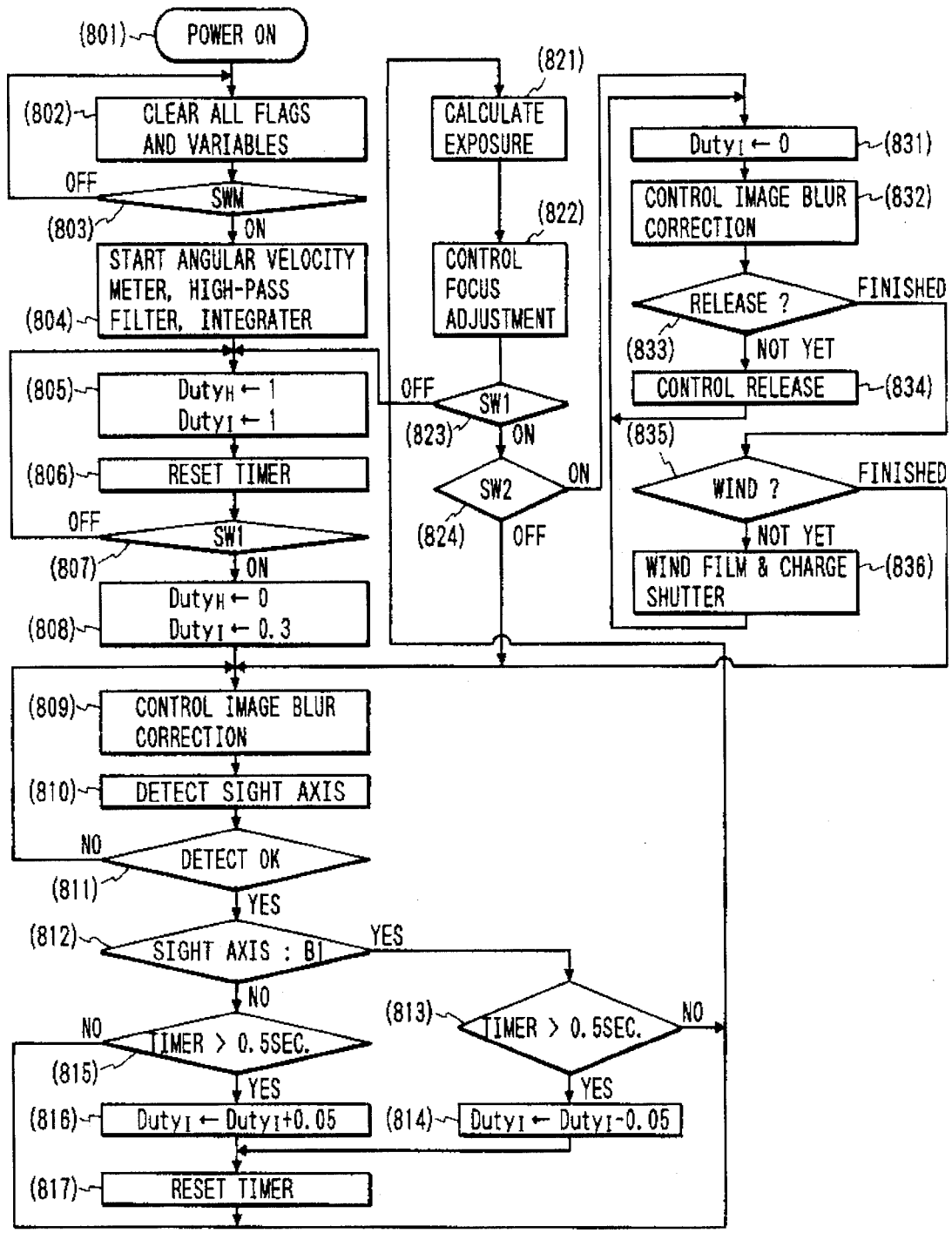
FIG. 17 is a flowchart to show an operation of a camera in the ninth embodiment of the present invention.

FIG. 17 is a flowchart to show an operation in the ninth embodiment according to the present invention.

Figure 16:
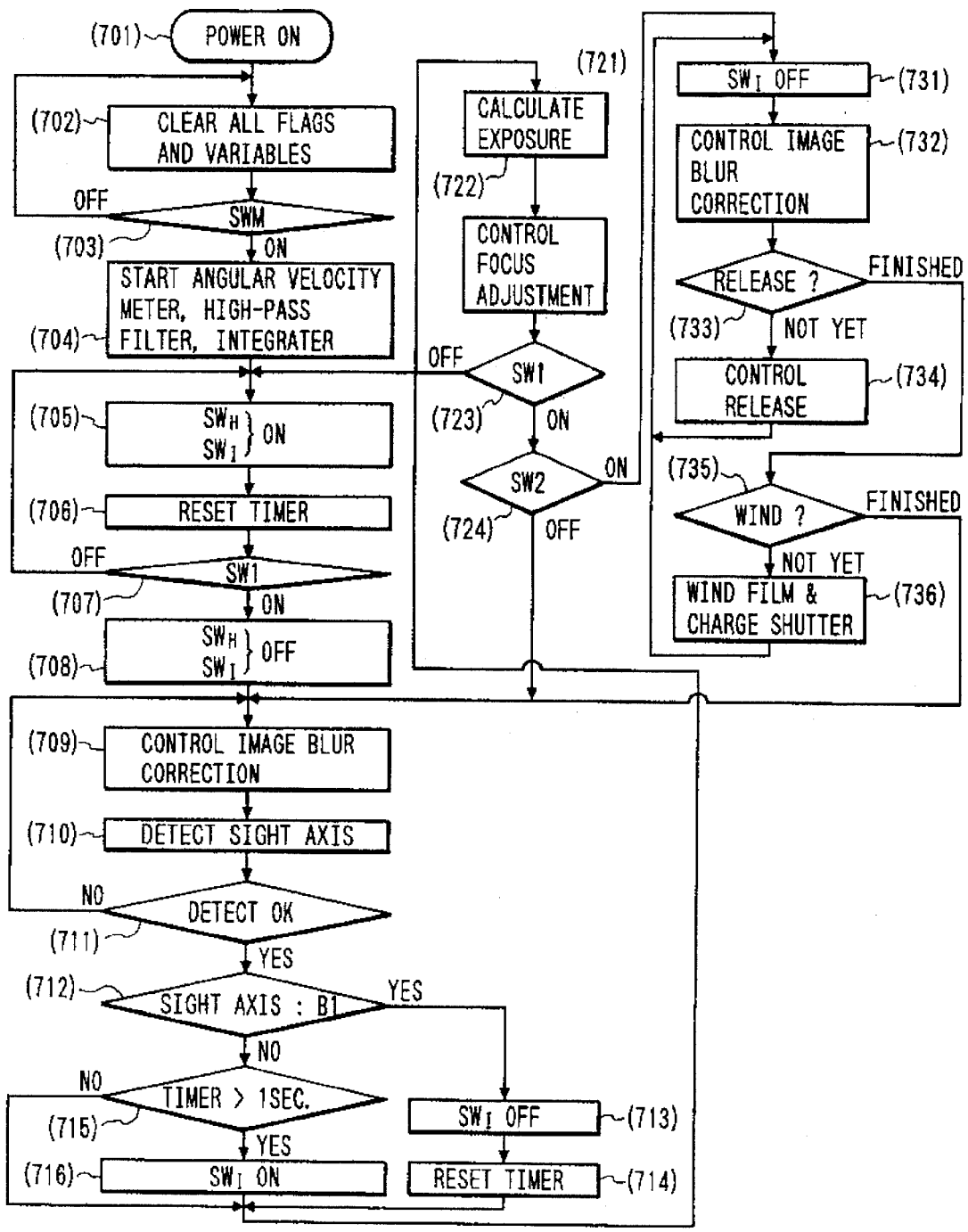
FIG. 16 is a flowchart to show an operation of a camera in the eighth embodiment of the present invention.

In the ninth embodiment, Steps 705, 708, 731, and 713 to 716 of the eighth embodiment in FIG. 16 are substituted by Steps 805, 808, 831, and 813 to 817 as shown in FIG. 17. Other steps are identical in content, and therefore only points changed are explained below.

If it is Judged at Step 813 that the main switch SWM is on, the vibration detection means is started operating at Step 804. Then at Step 805, a duty ratio $Duty_H$ defining an on ratio of the switch $SW_H$ of the high-pass filter 23 is set to be "1". Similarly, a duty ratio $Duty_I$ for the switch $SW_I$ of the integrator 24 is set to be "1". By them, the switches $SW_H$, $SW_I$ are always on, to provide the same effect as Step 705 in the eighth embodiment.

The timer TIMER is reset at Step 806. If the switch SW1 is Judged to be on at Step 807, the flow goes to Step 808.

At Step 808, the duty ratio $Duty_H$ is made to be "0" to set the switch $SW_H$ in the off condition, and the duty ratio $Duty_I$ is made to be "0.3". By them, the poll of the high-pass filter 23 becomes $f_{H1}$, and the poll of the integrator 24 becomes a value between $f_{I1}$ and $f_{I2}$. The image blur correction is then started at Step 809, and the sight axis detection is carried out at Step 810.

If the sight axis direction is in the region B1, that is, in the center at Step 812, the flow goes to Step 813. If a value of the timer TIMER is greater than a predetermined time, for example "0.5 second", the flow goes to Step 814 to subtract "0.05" from the value of the duty ratio $Duty_I$. If a photographer continuously observes the center of the finder screen for more than "0.5 second", the duty ratio is reduced to lower the poll of the integrator 24, whereby integrating including vibrations of lower frequency to extend the hand vibration correction property to the lower frequency range.

If the sight axis direction is in a region excluding the region B1 at Step 812, the flow goes to Step 815. If a value of the timer TIMER is greater than "0.5 second" at Step 815, a value of the duty ratio $Duty_I$ is increased by "0.05" at Step 816. In other words, if a photographer observes a region except the center of the finder screen for more than "0.5 second", the poll of the integrator 24 is increased to weaken the image blur correction effect in the lower frequency range.

After the execution of Step 814 or 816, the timer TIMER is reset at Step 817, the flow goes to Step 821 to perform the exposure calculation and the focus adjustment control, and returns via Steps 823, 824 to Step 809 to repeat the above-described flow. If the photographer continues looking at the central region B1 of the finder screen, the duty ratio $Duty_I$ also continues decreasing down to "0". On the contrary, if the photographer continues looking at the peripheral portion, the duty ratio $Duty_I$ continues increasing up to "1".

As explained above, the blur correction property continuously changes depending upon the motion of the sight axis direction of the photographer.

Tenth Embodiment

In the tenth embodiment as explained below, special regions are provided in the finder screen for controlling a change in the image blur correction, and, with recognition of the sight axis being directed toward either one of the special regions, either of the start or the end of the image blur correction and the change of the blur correction property may be executed.

Figure 18:
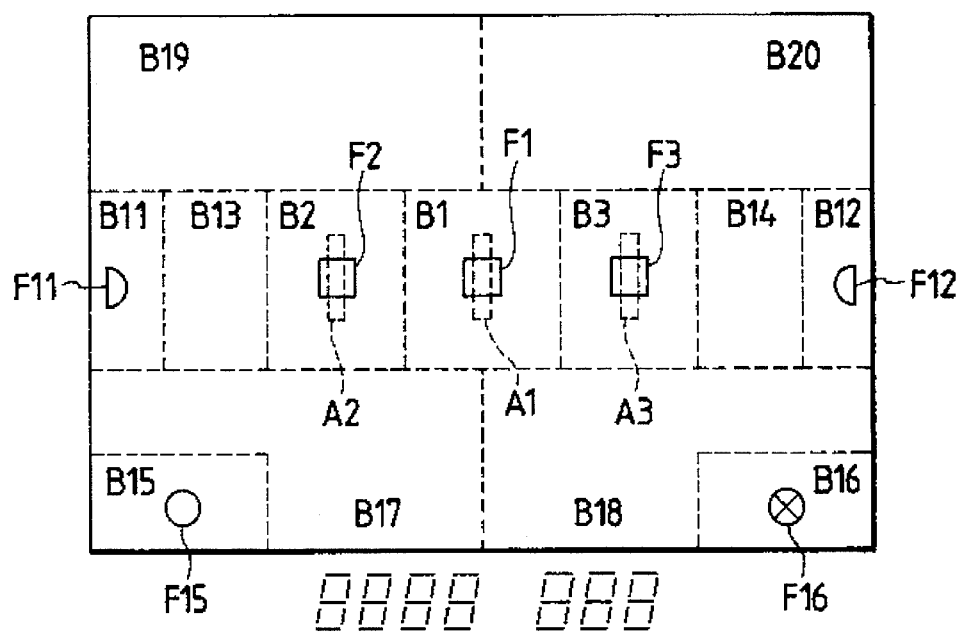
FIG. 18 is a plan view to show a view on a finder screen in the tenth embodiment of the present invention.

FIG. 18 is a plan view of the finder screen 8 in the tenth embodiment. In addition to the distance measurement frames F1, F2, and F3 same as in FIG. 15, there are provided input frames of panning operation F11, F12, an image blur correction start frame F15, and an image blur correction end frame F16. Also, the sight axis detection sensor 33 is separated into detection regions as B11 to B20 in addition to the regions B1, B2, B3. The regions B11, B12 corresponds to the frames F11, F12, and the regions B15, B16 to the frames F15, F16, respectively. When a photographer wants to start the image blur correction, the photographer looks at the frame F15. The sight axis detection sensor 33 detects that the sight axis direction of the photographer is directed to the region B15 to start the image blur correction. If the photographer wants to stop the image blur correction, he or she looks at the frame F16 to end the image blur correction similarly.

If the photographer wants the panning operation, he or she looks at either the frame F11 or F12. It is detected that the sight axis direction is either in the region B11 or B12 and then the on-off duty ratio of the switch $SW_I$ in the integrator 24 is changed similarly as in the ninth embodiment.

Figure 19:
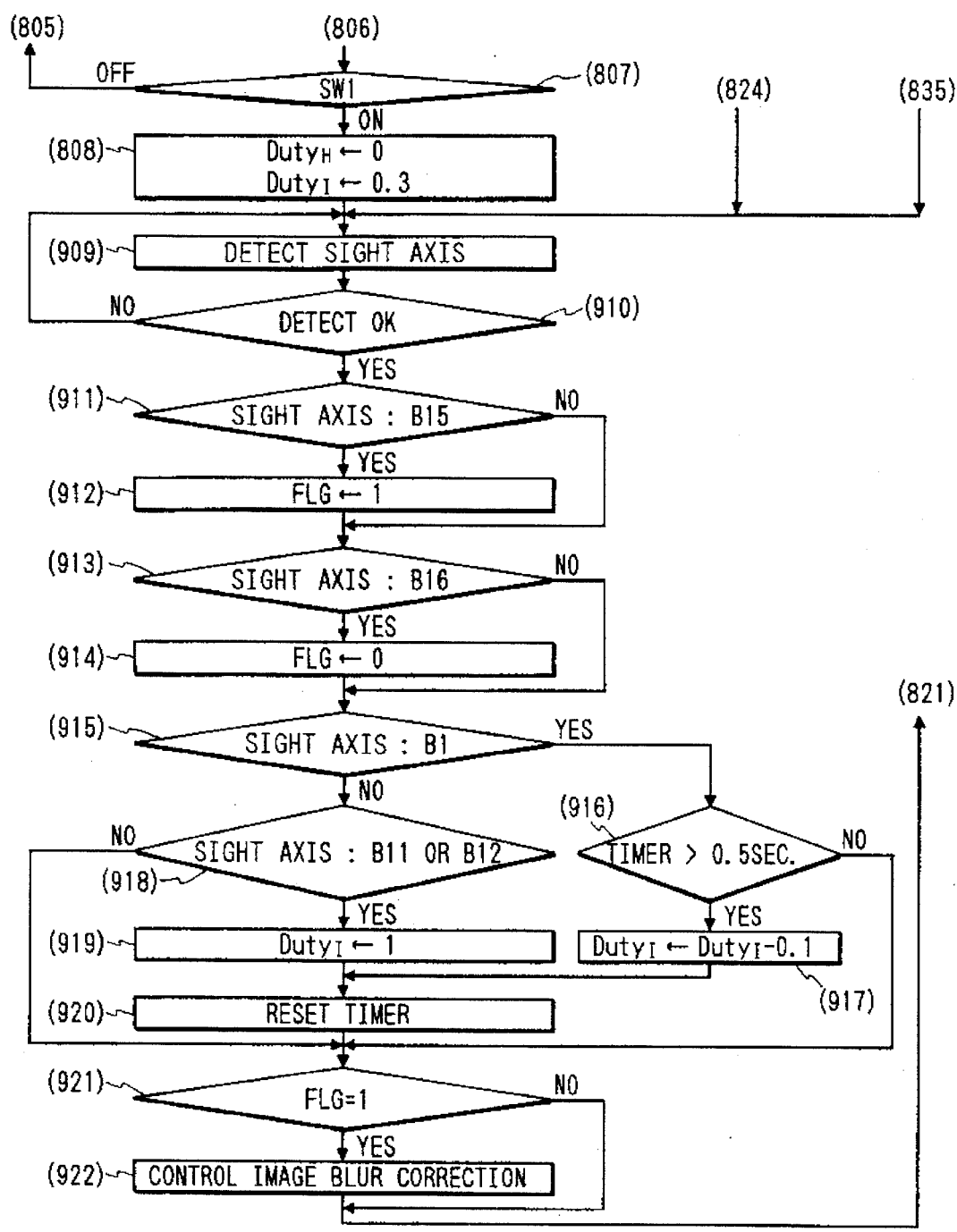
FIG. 19 is a flowchart to show an operation of a camera in the tenth embodiment of the present invention.

FIG. 19 is a part of a flowchart to show an operation in the tenth embodiment according to the present invention.

The tenth embodiment is the same as the ninth embodiment of FIG. 17 in Steps 801 to 808, 821 to 824, and 831 to 836, but different from that in Steps 809 to 817. Therefore, only different steps are shown in FIG. 17 as Steps 909 to 922, and only the different steps are explained below.

If it is judged at Step 807 that the switch SW1 is on, the duty ratios $Duty_H$, $Duty_I$ are set to be "0" and "0.3", respectively, at Step 808.

The sight axis detection is carried out at Step 909. If the sight axis detection is not finished at Step 910 yet, the flow returns to Step 909. If the sight axis is correctly detected, the flow goes to Step 911.

It is judged at Step 911 whether the sight axis direction is in the region B15, that is, whether the photographer looks at the image blur correction start frame F15. If "YES", the flow goes to Step 912 to set "1" for an image blur correction start flag FLG. If the sight axis direction is recognized in the region B15, the flag is latched at "1", while if the sight axis direction is in the region B16, it is latched at "0". Namely, the flag becomes a flag to define whether the image blur correction control should be effected or not.

If the sight axis direction is in a region excluding the region B15 at Step 911, the flow goes to Step 913 ignoring Step 912.

It is Judged at Step 913 whether the sight axis direction is in the region B16. If "YES", the flag FLG is set to be "0" at Step 914. If "NO", nothing is done and the flow goes to Step 915.

It is judged at Step 915 whether the sight axis direction is in the region B1, that is, in the center of the finder screen. If "YES", the flow goes to Step 916 to judge a value of the timer TIMER. If more than "0.5 second" elapses after the timer TIMER is reset, it is judged that the photographer is in the way of panning operation. Then, the duty ratio $Duty_I$ is reduced by "0.1" at Step 917 to extend the blur correction band area to the lower frequency range.

If the Judgement at above Step 915 is "NO", it is judged at Step 918 whether the sight axis direction is in region B11 or B12. If "YES", it is deemed that the photographer gazes at the panning operation input frame F11 or F12. Then, the duty ratio $Duty_I$ is set at "1" at Step 919. By that, the switch $SW_I$ of the integrator 24 is always kept in the on state, so that deflection signals of lower frequencies are excluded from integration, whereby the blur correction would not impede the panning operation.

After the execution of Step 917 or 919, the timer TIMER is reset at Step 920, and the flow goes to Step 921.

If "NO" is judged at Step 916 or 918, the flow goes to Step 921 without a change of duty ratio.

A judgement of the image blur correction start flag FLG is carried out at Step 921. If the start flag FLG is "1", the flow goes to Step 922 to carry out the image blur correction. If "0" the flow goes to Step 921 without the image blur correction.

To summarize the operation of the above flow, the start or the end of the image blur correction is controlled by gazing of the photographer at the frame F15 or F16, and the image blur correction property is switched into that suitable for the panning by gazing at frame F11 or F12. Then, if the photographer continues gazing at the center of the finder screen after completion of the panning, the blur correction band area is continuously extended to the lower frequency range to gradually intensify the hand vibration correction.

Although the switch means for switching the poll of the integrator to integrate the vibration angular velocity signal is used as the change means of the image blur correction property in the above eighth to tenth embodiments, it may be suitably replaced by switching of the property of the high-pass filter. There is of course no problem caused by arranging the high-pass filter and the integrator as digital calculation circuits in the micro-computer 21. The image blur correction (or image blur detection) may also be effectively started by a lens operation switch (zoom operation, power focus operation, or the like) instead of by the switch SW1.

The vibration detection sensor may be a sensor other than the angular velocity meter, for example an angular acceleration meter, or an angular displacement meter. If the angular acceleration meter is used, the high-pass filter and the integrator are normally used, and therefore the same control as the present embodiment may be conducted. If the angular displacement meter is used, no integrator is needed, but means corresponding to the high-pass filter is needed. Thus, the property of the means may be properly switched for the control.

The present invention is not applied only to a still camera, but also to a movie camera.

As explained above, according to the first to third embodiments, it is detected whether the photographer is in the way of photograph start by a judgement about whether a part of a body of the photographer approaches the camera, or, by a judgement of a condition of switch means, for example, a main switch in a single-lens reflex camera, to select permission or inhibition of photo-taking preparation operation or photo-taking operation, or of one of various control operations. If the photo-taking start preparation is detected, the operation of the vibration detecting means, which has a defect in rise property, is started at least prior to the trigger of the photo-taking preparation operation start. Therefore, an unnecessary image blur correction operation may be avoided, waste dissipation of power may be prevented, and a quick image blur correction may be effected in response to the photo-taking action of the photographer.

Further, according to the fourth to seventh embodiments, the control of operation start of the image blur correction means and the photo-taking condition control means is carried out in accordance with the Judgement result about whether a part of a body of the photographer approaches the camera and with the condition Judgement result of the trigger means for photo-taking preparation operation start of the camera. Accordingly, the image blur correction operation may be conducted only when necessary, whereby breakage of the above means due to a careless image blur correction operation may be prevented, waste dissipation of power may also be prevented, and an excellent feeling in use may be provided.

Also, according to the eighth and ninth embodiments, it is Judged whether a vibration is risen from a camera vibration due to an intentional operation such as the panning of the photographer or from a camera vibration to be corrected in image blur based on the detection result of sight axis direction by the sight axis detection means, and the image blur correction property is changed in accordance with the judgement result. Accordingly, a responsibility may be improved in the intentional operation such as the panning without deterioration of the image blur correction property.

Further, according to the tenth embodiment, the control of the image blur correction operation may be conducted by the simple change of the sight axis direction in which the photographer is gazing. Therefore, there is no switch means necessary for indicating the start and the stop of the image blur correction operation.

According to the first to seventh embodiments as described above, the apparatus is so arranged that the operation of the image blur correction means is started in accordance with the detection result of the detection means about whether a part of body of the photographer has approached or not, whereby the image blur correction (vibration suppression) operation may be started in a more appropriate timing. Thus, the waste power dissipation may be prevented, and an excellent feeling in use may be provided thereby.

Further, in the eighth to tenth embodiments, the switch of operation property of the image blur correction means (image stabilizing means) or the control of whether the image blur correction (vibration suppression) should be carried out or not is executed in accordance with the sight axis direction of the photographer, whereby the image blur correction may become effected in a more appropriate image blur correction property. In addition, it becomes possible to eliminate switch means for change of image blur correction property and for start or stop of image blur correction.

What is claimed is:

1. An apparatus for use with an image blur prevention device which operates to prevent image blur in a first state and a second state, comprising:

a first operation portion; and a second operation portion being operated based on a direction of a line of sight of a user, said second operation portion, in a state where said first operation portion is operated with a predetermined operation, changing the image blur prevention device from the first state to the second state in accordance with a first operation, and changing the image blur prevention device from the second state to the first state in accordance with a second operation.

2. An apparatus according to claim 1, wherein the second operation portion comprises means for changing the image blur prevention device from a non-operation state to an operation state in accordance with the first operation, and for changing the image blur prevention device from the operation state to the non-operation state in accordance with the second operation.

3. An apparatus according to claim 1, wherein the second operation portion comprises means for changing the image blur prevention device from a state where the image blur prevention device is operated with a first operation characteristic to a state where the image blur prevention device is operated with a second operation characteristic different from the first operation characteristic in accordance with the first operation, and for changing the image blur prevention device from the state where the image blur prevention device is operated with the second operation characteristic to the state where the image blur prevention device is operated with the first operation characteristic in accordance with the second operation.

4. An apparatus according to claim 3, wherein said second operation portion comprises means for changing the image blur prevention device from a state where the image blur prevention device is operated with a first frequency characteristic to a state where the image blur prevention device is operated with a second frequency characteristic different from the first frequency characteristic in accordance with the first operation, and for changing the image blur prevention device from the state where the image blur prevention device is operated with the second frequency characteristic to the state where the image blur prevention device is operated with the first frequency characteristic in accordance with the second operation.

5. An apparatus according to claim 1, further comprising means for changing the state of the image blur prevention device corresponding to the operation of said second operation portion in accordance with said first operation portion being operated with the predetermined operation.

6. An apparatus according to claim 1, wherein said first operation portion comprises an operation portion for performing an operation related to a photography.

7. An apparatus according to claim 6, wherein said first operation portion comprises an operation portion for performing a photography readying operation.

8. An apparatus according to claim 1, wherein said first operation portion comprises a main switch of the apparatus.

9. An apparatus according to claim 1, wherein said first operation portion comprises a main switch of a camera.

10. An apparatus according to claim 1, wherein said first operation portion comprises a release operation portion of a camera.

11. An apparatus according to claim 1, further comprising a control portion for changing the state of the image blur prevention device corresponding to the operation of said second operation portion after the predetermined operation is performed, wherein the predetermined operation is performed in accordance with the predetermined operation of said first operation portion.

12. An apparatus according to claim 11, wherein said control portion comprises means for changing the state of the image blur prevention device corresponding to the operation of said second operation portion after at least a part of a start-up operation of the image blur prevention device is performed.

13. An apparatus according to claim 11, wherein said control portion comprises means for changing the state of the image blur prevention device corresponding to the operation of said second operation portion after at least a part of a start-up operation of the image blur detection device for detecting an image blur state is performed.

14. An apparatus according to claim 1, further comprising means for changing the state of the image blur prevention device corresponding to the operation of the second operation portion after the predetermined operation of said first operation portion is performed and after a predetermined time period has elapsed.

15. An apparatus according to claim 1, wherein said second operation portion comprises means for changing a state of an image blur correction device for correcting image blur.

16. An apparatus according to claim 1, wherein said second operation portion comprises means for recognizing, as a first operation, that a direction of a line of sight is directed to a first position, and recognizing, as the second operation, that the direction of the line of sight is directed to a second position.

17. An apparatus according to claim 1, wherein said second operation portion comprises means for recognizing, as the first operation, that a direction of a line of sight is directed to a predetermined position when the image blur prevention device is in the first state.

18. An apparatus according to claim 1, wherein said second operation portion comprises means for recognizing, as the second operation, that a direction of a line of sight is directed to a predetermined position when the image blur prevention device is in the second state.

19. An image blur prevention apparatus which operates for image blur prevention being operable in a first state and a second state, comprising:

an image blur prevention device for preventing image blur;

a first operation portion; and a second operation portion being operated based on a direction of a line of sight of a user, said second operation portion, in a state where said first operation portion is operated with a predetermined operation, changing said image blur prevention device from the first state to the second state in accordance with a first operation, and changing said image blur prevention device from the second state to the first state in accordance with a second operation.

20. An optical equipment comprising:

a first operation portion; and a second operation portion being operated based on a direction of a line of sight of a user, said second operation portion, in a state where said first operation portion is operated with a predetermined operation, changing an image blur prevention device from a first state to a second state in accordance with a first operation, and changing the image blur prevention device from the second state to the first state in accordance with a second operation.

21. A camera comprising:

a first operation portion; and a second operation portion being operated based on a direction of a line of sight of a user, said second operation portion, in a state where said first operation portion is operated with a predetermined operation, changing an image blur prevention device from the first state to the second state in accordance with a first operation, and changing the image blur prevention device from the second state to the first state in accordance with a second operation.

* * * * *

UNITED STATES PATENT AND TRADEMARK OFFICE
CERTIFICATE OF CORRECTION

PATENT NO. : 5,585,884
DATED : December 17, 1996
INVENTOR(S) : ICHIRO ONUKI

It is certified that error appears in the above-indentified patent and that said Letters Patent is hereby corrected as shown below:

Column 5

Line 21, "$f_{H2}=(R_{H1}+R_{H2})/(2\pi \times R_{H1} \times R_{H2} \times C_H) \leq f_{HI}.$" should read --$f_{H2}=(R_{H1}+R_{H2})/(2\pi \times R_{H1} \times R_{H2} \times C_H) > f_{HI}.$--.

Line 41, "$F_{I2}=(R_{I3}+R_{I4})/(2\pi \times R_{I3} \times R_{I4} \times C_1) \leq f_{II}.$" should read --$f_{I2}=(R_{I3}+R_{I4})/(2\pi \times R_{I3} \times R_{I4} \times C_1) > f_{II}.$--.

Column 6

Line 21, "Judged" should read --judged--.
Line 44, "Step 009." should read --Step 009,--.

Column 7

Line 7, "Judged" should read --judged--.

Column 8

Line 42, "Of" should read --of--

Column 10

Line 37, "Judged" should read --judged--.
Line 61, "Judged" should read --judged--.
Line 63, "luminarice" should read --luminance--.

UNITED STATES PATENT AND TRADEMARK OFFICE
CERTIFICATE OF CORRECTION

PATENT NO. : 5,585,884
DATED : December 17, 1996
INVENTOR(S) : ICHIRO ONUKI

It is certified that error appears in the above-indentified patent and that said Letters Patent is hereby corrected as shown below:

Column 11

Line 17, "Judged" should read --judged--.
Line 20, "Judged" should read --judged--.
Line 60, "Judge" should read --judge--.

Column 16

Line 40, "Is" should read --is--.
Line 44, "Judgement" should read --judgement--.
Line 64, "Integration" should read --integration--.

Column 18

Line 21, "Judged" should read --judged--.
Line 29, "Judged" should read --judged--.

Column 19

Line 56, "Judged" should read --judged--.

UNITED STATES PATENT AND TRADEMARK OFFICE
CERTIFICATE OF CORRECTION

PATENT NO. : 5,585,884
DATED : December 17, 1996
INVENTOR(S) : ICHIRO ONUKI

It is certified that error appears in the above-indentified patent and that said Letters Patent is hereby corrected as shown below:

Column 20

Line 1, "Judgement" should read --judgement--.

Column 21

Line 2, "Judgement" should read --judgement--.
Line 4, "Judgement" should read --judgement--.
Line 12, "Judged" should read --judged--.

Signed and Sealed this

Twenty-seventh Day of May, 1997

Attest:

BRUCE LEHMAN

*Attesting Officer*　　　　*Commissioner of Patents and Trademarks*